(12) United States Patent
Chmelka

(10) Patent No.: US 12,030,573 B1
(45) Date of Patent: Jul. 9, 2024

(54) BICYCLE STORAGE RACK

(71) Applicant: Robert Stuart Chmelka, Ventura, CA (US)

(72) Inventor: Robert Stuart Chmelka, Ventura, CA (US)

( * ) Notice: Subject to any disclaimer, the term of this patent is extended or adjusted under 35 U.S.C. 154(b) by 0 days.

(21) Appl. No.: 18/442,543

(22) Filed: Feb. 15, 2024

(51) Int. Cl.
*B62H 3/08* (2006.01)
*B62H 3/00* (2006.01)

(52) U.S. Cl.
CPC ............. *B62H 3/08* (2013.01); *B62H 3/00* (2013.01)

(58) Field of Classification Search
CPC ... B62H 3/02; B62H 3/08; B62H 3/00; B62H 3/04; B62H 3/12; B62K 3/002; B66F 7/02
See application file for complete search history.

(56) References Cited

U.S. PATENT DOCUMENTS

| | | | | |
|---|---|---|---|---|
| 4,442,961 A * | 4/1984 | Bott | ............ | B62H 3/08 224/570 |
| 4,452,384 A * | 6/1984 | Graber | ............ | B60R 9/10 211/20 |
| 4,733,810 A * | 3/1988 | Graber | ............ | B60R 9/10 224/325 |
| 5,560,498 A * | 10/1996 | Porter | ............ | B62H 3/08 211/20 |
| 5,988,403 A * | 11/1999 | Robideau | ............ | B62H 3/08 211/20 |
| 6,394,283 B1 * | 5/2002 | Fletcher | ............ | B62H 5/00 211/20 |
| 6,460,743 B2 * | 10/2002 | Edgerly | ............ | B60R 9/048 224/571 |
| D480,350 S * | 10/2003 | Ho | ............ | D12/408 |
| 7,694,830 B1 * | 4/2010 | Larson | ............ | B62H 3/08 211/20 |
| 8,267,293 B2 * | 9/2012 | Liu | ............ | B60R 9/048 224/310 |
| 11,142,272 B1 * | 10/2021 | McDowell | ............ | B62H 3/08 |
| 2006/0124678 A1 * | 6/2006 | Wooten | ............ | B60R 9/045 224/317 |
| 2022/0314895 A1 * | 10/2022 | Wärnelöv | ............ | B60R 9/06 |

* cited by examiner

*Primary Examiner* — Ko H Chan
(74) *Attorney, Agent, or Firm* — Metropolis IP Group, LLC; Eric Kang

(57) ABSTRACT

A system for compactly storing and easily transporting one or more two-wheeled vehicles, comprising a plurality of slender trays, wherein each tray comprises a tray base, one or more slotted wheel housing(s), a wheel securement sub-assembly; one or more cross-member(s); a plurality of casters and/or resting pads; wherein the tray bases are attached to the cross-member(s) at an orthogonal angle; wherein the casters and/or resting pads are each attached to the underside of the cross-member(s). Trays may be secured to the cross-members so that the front of each bicycle is oriented in an alternating fashion from one tray to the next. The longitudinal fore-aft position of each tray may also be in a staggered arrangement. Finally, vertical riser blocks placed between a cross-member and a tray may be further employed.

19 Claims, 26 Drawing Sheets

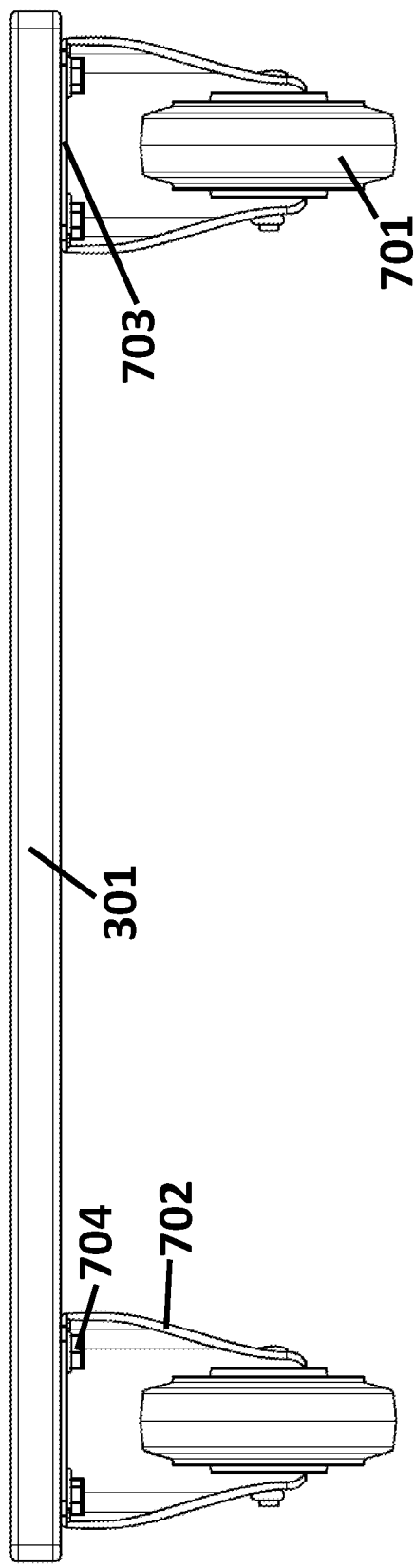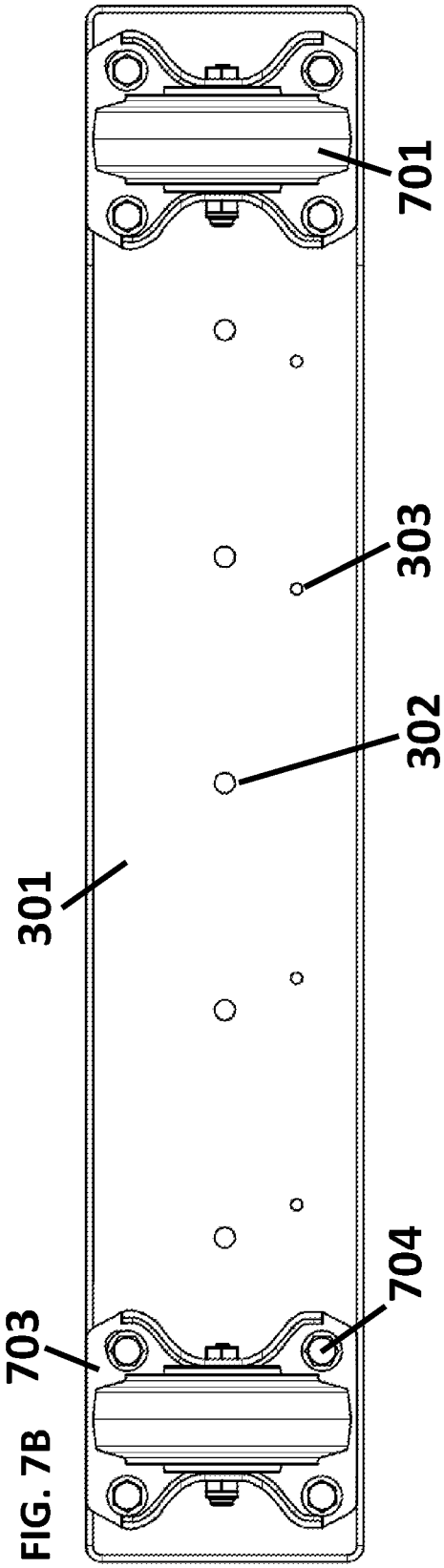

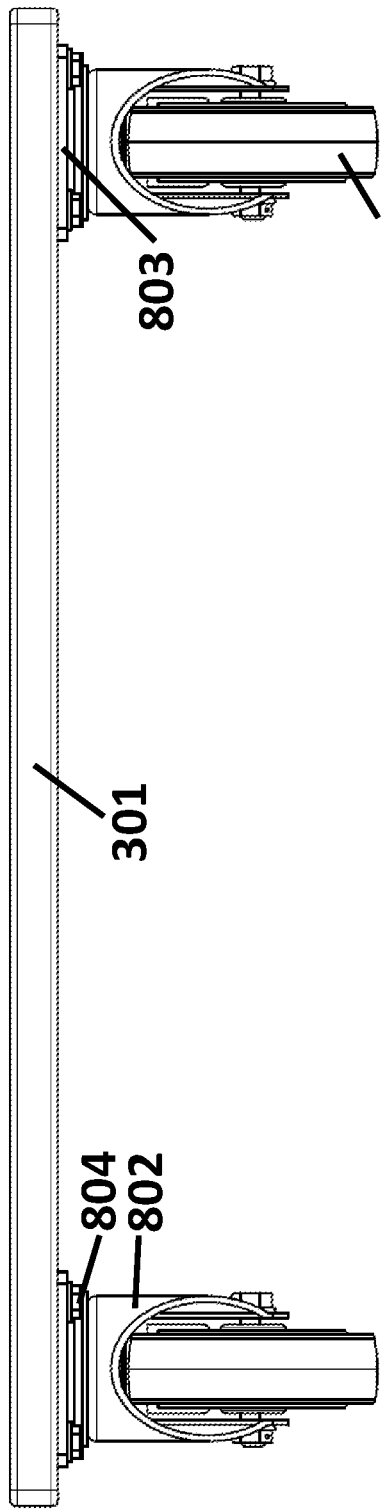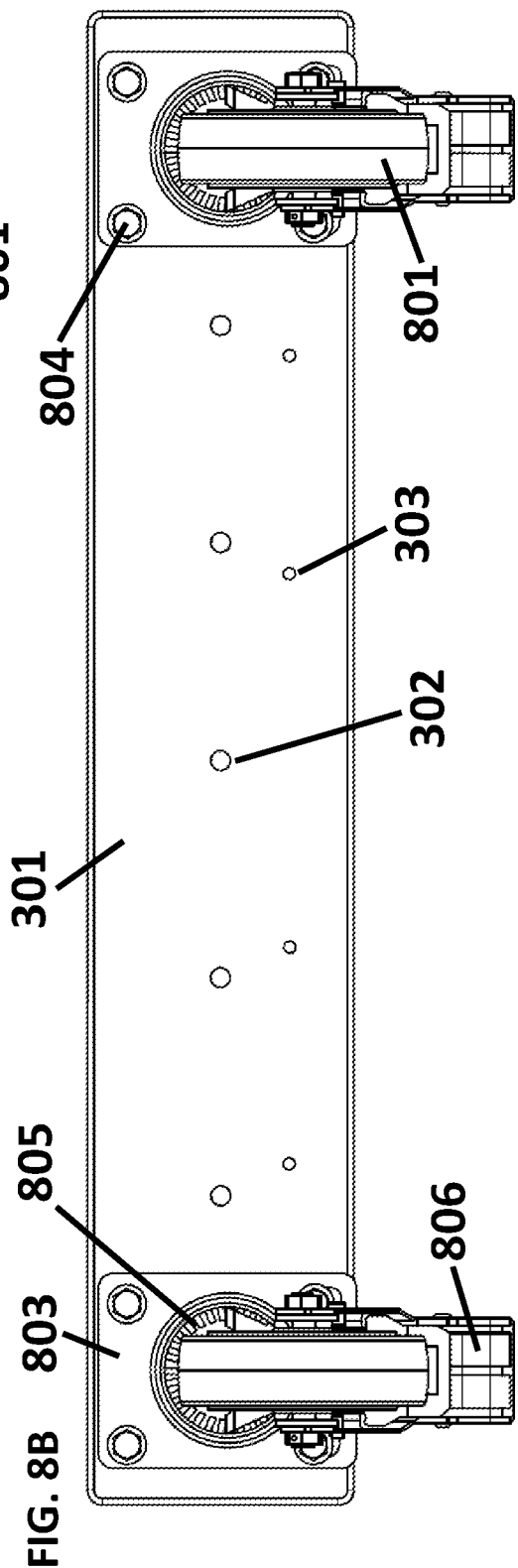

BICYCLE STORAGE RACK

FIELD OF THE DISCLOSURE

The field of the disclosure relates to a system for storing two-wheeled vehicles and, more particularly, a space-efficient and mobile bicycle storage rack.

BACKGROUND OF THE DISCLOSURE

Bicycles are typically stored along a wall (U.S. Pat. No. 5,984,111; U.S. Publication Nos. 2013/0270201, 2016/0288850, 2017/0369114), suspended from a ceiling, or on floor space (U.S. Pat. Nos. 5,917,407, 8,500,074; U.S. Publication No. 2007/0221589). When bicycles are stored in a congested area filled with other items like tools or equipment, it becomes cumbersome to access those other items unless one or more bicycles are individually removed from the fixed storage structures. Currently, no prior existing bicycle storage rack accommodates multiple fully assembled bicycles of different shapes and sizes, has a compact footprint, and is easily mobile.

SUMMARY OF THE DISCLOSURE

The following discloses a novel remedy to the prior void in bicycle storage offerings. The present invention is a rollable rack, where the rack comprises a plurality of slender trays arranged as a parallel array that are each meant to support one bicycle or, more generally, a two-wheeled vehicle where a front wheel and a rear wheel are lying on a common plane. Examples of such two-wheeled vehicles comprise a bicycle, an electric bike ("e-bike"), a moped, a motorcycle, and a scooter.

Each tray comprises a base, one or more slotted wheel housings mounted on the base that each surrounds portions of a bicycle's tire and wheel, a wheel-securing subassembly comprising a pinned swing arm with a slotted wheel holder, and a detachable fastener to secure the swing arm's slotted wheel holder with one of the wheels/tires. One or more cross-members link the slender trays. One or more casters and/or resting pads are secured to the underside of the distal ends of each cross-member so that the rack is easily transportable.

Lateral inter-tray spacing is minimized while geometric interference between one bicycle with another is avoided by the employment of a few provisions. For example, the trays may be secured to said cross-members so that the front of each bicycle is oriented in an alternating fashion from one tray to the next. The longitudinal fore-aft position of each tray may also be in a staggered arrangement and vertical riser blocks which are placed between a cross-member and a tray may be further employed.

BRIEF DESCRIPTION OF THE DRAWINGS

The drawings are provided to facilitate understanding of the detailed description. It should be noted that the drawing figures may be in simplified form and might not be at a precise scale. About the disclosure herein, for purposes of convenience and clarity only, directional terms such as top, bottom, left, right, up, down, over, above, below, beneath, rear, front, distal, proximal, side-on, underside, and overhead are used for the accompanying drawings. Such directional terms should not be construed to limit the scope of the embodiment in any manner. Certain features like holes in one or more drawing figure(s) may not be apparent in other drawing figure(s) and do not necessarily indicate a different embodiment. Clarifications will be made in the following sections to features that are omitted to more clearly convey other features that are the focus.

FIG. 7A is an orthographic view of an upright cross-member with two fixed casters attached to the underside of the cross-member's base FIG. 7B is an orthographic view of the underside of a cross-member's base with two fixed casters attached FIG. 8A is an orthographic view of an upright cross-member with two swivel casters attached to the underside of the cross-member's base FIG. 8B is an orthographic view of the underside of a cross-member's base with two swivel casters attached

DETAILED DESCRIPTION OF THE DISCLOSURE

Figure 1:
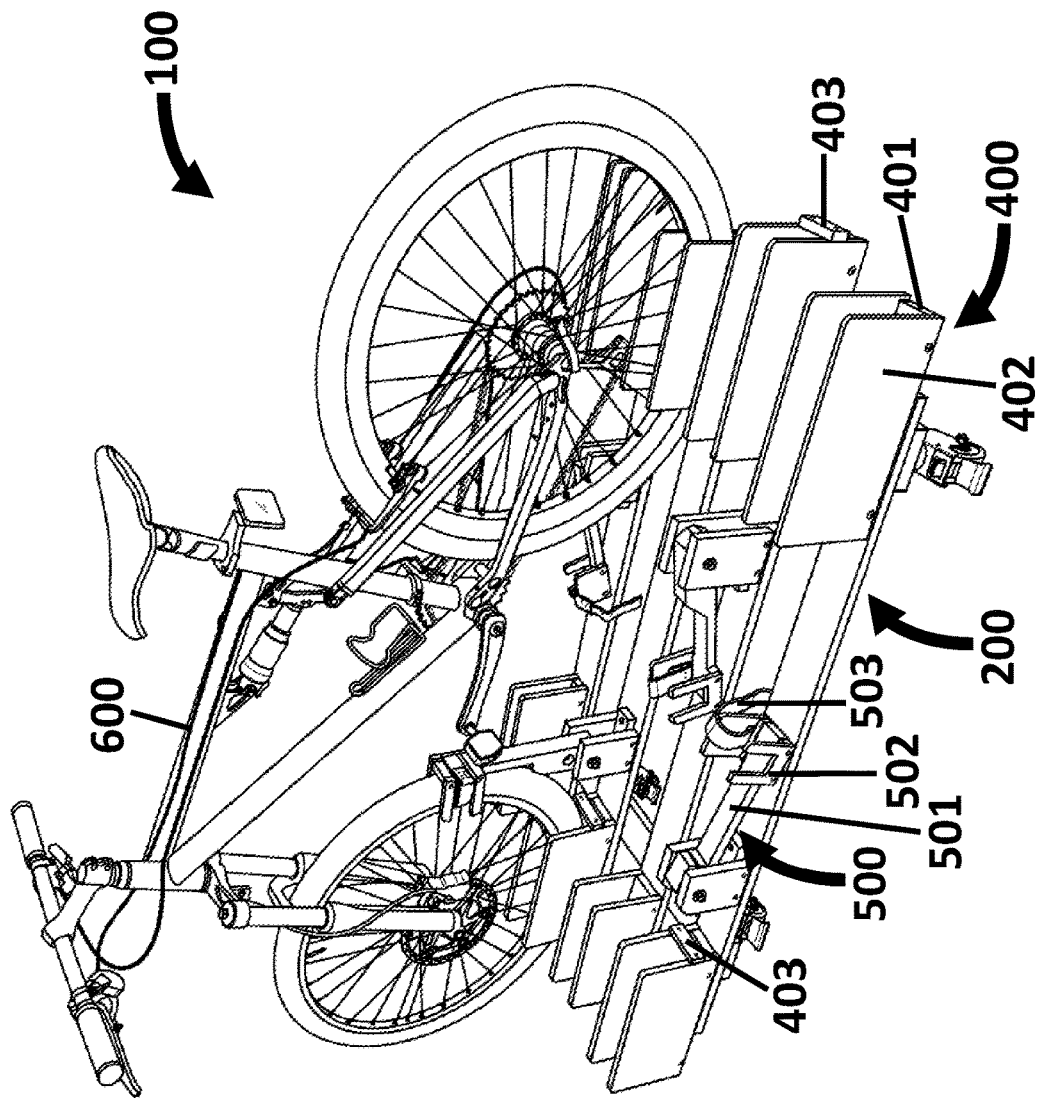
FIG. 1 is a perspective view of a four-tray rack with one bicycle secured to one tray
Figure 2:
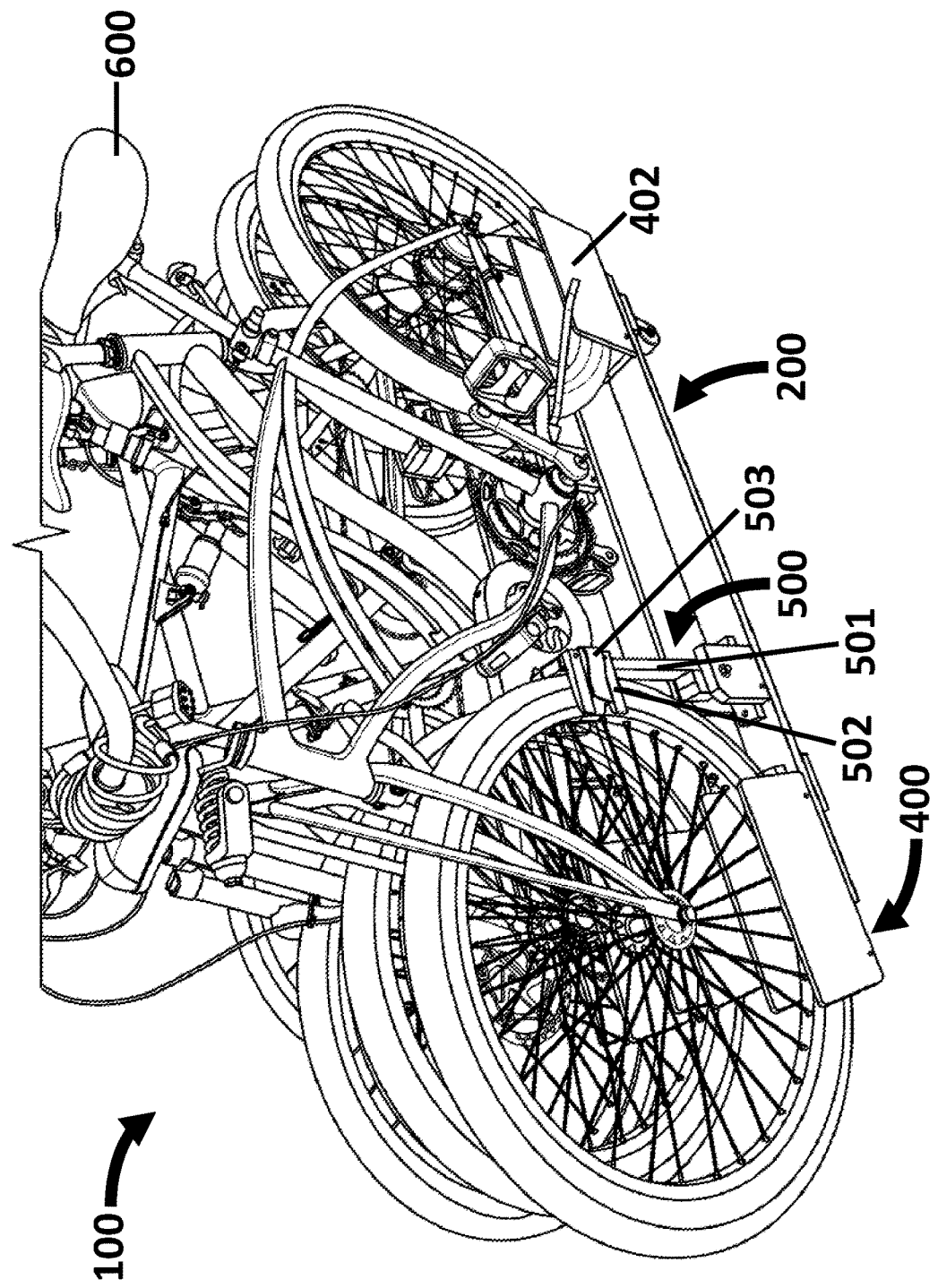
FIG. 2 is a perspective view of the four-tray rack with a bicycle secured to each tray in an overall compact arrangement
Figure 3:
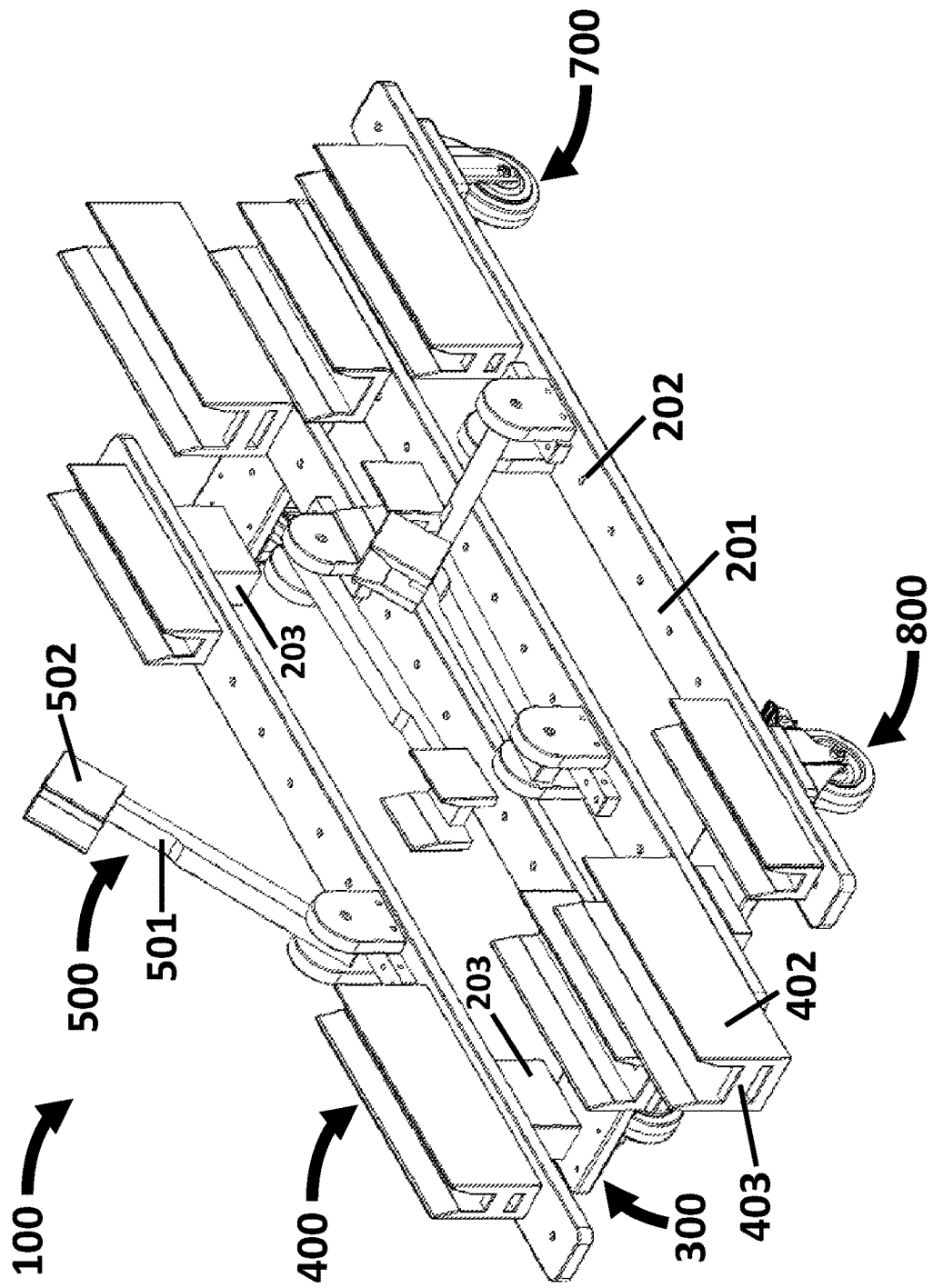
FIG. 3 is a view of the four-tray rack

OVERVIEW: FIGS. 1-3 show an embodiment of a bicycle storage rack ("rack") 100, which comprises a parallel array of closely spaced and slender trays 200, where each tray is laterally located by one or more cross-members 300. The general footprint of the exemplary rack 100 is roughly rectangular with a longitudinal extent, that which is along a tray's 200 length, which is longer than the lateral extent, where the lateral extent is along a cross-member's length.

Each tray 200 comprises one or more slotted wheel housings 400 and a wheel-securing subassembly 500. Each wheel housing 400 comprises a base ("wheel housing base") 401 and a pair of wings ("wheel housing wings") 402 whose bottom portion of the parallel inside facing surfaces are attached to the lateral extents of the wheel housing base 401. In the exemplary embodiment, the wheel-securing subassembly 500 comprises a swing arm 501 pin-constrained at one distal end, a pair of wheel-securing assembly wings 502 whose parallel inside facing surfaces are attached to the swing arm 501 at the opposite distal end from where said pin is placed, and a fastening element 503 (shown only in FIGS. 1-2) such as a strap with a hook and loop fastener (e.g., Velcro®) to attach the wing end of said swing arm 501 and wheel-securing assembly wings 502 to a portion of a wheel/tire of a bicycle 600. Other than the strap with a hook and loop fastener, the fastening element 503 may alternatively comprise a ratcheting strap, a clamp, or a cammed locking pin, which are not shown in any of the figures. Hence, the exemplary embodiment of this wheel-securing subassembly 500 is otherwise called a swing arm assembly.

In the exemplary embodiment, each tray 200 holds one bicycle 600, but alternative embodiments of the present invention can be scaled or configured to hold planar two-wheeled vehicles comprising an e-bike, moped, scooter, and motorcycle. The exemplary embodiment of the rack 100 further comprises a pair of cross-members 300 that are separated from each other by approximately the wheelbase of the bicycle 600 with the longest wheelbase intended for parking on the rack 100.

The exemplary embodiment of the rack 100 further comprises one or more casters 700, 800 attached to the underside of each cross-member 300 so that the rack 100 is rollable on a surface and therefore easily transportable. Furthermore, embodiments of the present invention may have fixed 700 or swivel 800 casters. The exemplary embodiment of the rack 100 has a pair of fixed casters 700 attached to one cross-member 300 and a pair of swivel casters 800 attached to another cross-member 300 so that the rack 100 may be easily maneuvered during transport.

In alternative embodiments, the casters 700, 800 may be partially or fully substituted by resting pads (not shown), which may be blocks, pads, or structures resembling commonly known medical walker ski glides. With this alternative embodiment, the rack 100 may be lifted and transported by a separate handle with a swivel caster (not shown) that is connectable to the underside of said rack cross-member 300.

FIG. 1 shows one bicycle 600 parked on one tray 200 with the wheel-securing assembly wings 502 of one of said swing arm assemblies 500 secured to the bicycle's wheel/tire using a strap 503. When a bicycle 600 is parked on a tray 200, the wheel housing wings 402 of the wheel housings and wheel-securing assembly wings 502 of the swing arm assembly of the same tray 200 collectively prevent the bicycle from tipping over. FIG. 2 shows four bicycles 600 of various form factors (sizes and shapes) each parked on their respective trays 200 at a close lateral distance, standing upright, with no geometric interference between one bicycle and another bicycle.

RACK AND RELATION OF SUBASSEMBLIES: To show the general relation of one component of the rack 100 with another, FIGS. 3-10 are provided here with various views of the rack 100, cross-member(s) 300, and attached parts or assemblies 200, 400, 500, 700, 800. Each tray 200 comprises a tray base 201 that has a plurality of through-holes 202 along a line from nearly one end of the tray base to the other end of the tray base. These holes 202 are used to anchor fasteners that attach each wheel housing 400 and each swing arm assembly 500 to a tray base 201 as well as connect a tray base with a cross-member 300. The holes 202 of the tray bases are not shown in FIGS. 1-2 to more clearly convey the larger-scale, macroscopic aspects of the rack 100 and how the bicycle 600 is placed on the rack, but the holes are present in the preferred embodiment of the current invention.

The fastener holes 202 of the tray base may be threaded to be capable of receiving threaded fasteners. Depending on the application and expected mass of the bicycle 600, the diameter of each hole 202 may range from an eighth to three-quarters of an inch. Alternatively, the holes 202 may each be unthreaded and accommodate a threaded insert that is affixed to the hole. A threaded insert in each hole 202 made of hard metal or harder material than the tray base 201 is desirable for enhanced longevity and durability from worn or stripped threads. If used, the threaded inserts should not protrude beyond the top and underside flat surfaces of any tray base 201.

Other embodiments of the holes 202 may not be threaded nor have a threaded insert. Such holes 202 would receive fasteners like rivets, pins, or bolts with a shank and separate threaded portion. Embodiments that use bolts or screws with a shank and threaded portion would use a separate nut to put two pieces together when the nut is tightened down on a bolt or screw with a shank and threaded portion.

Figure 6:
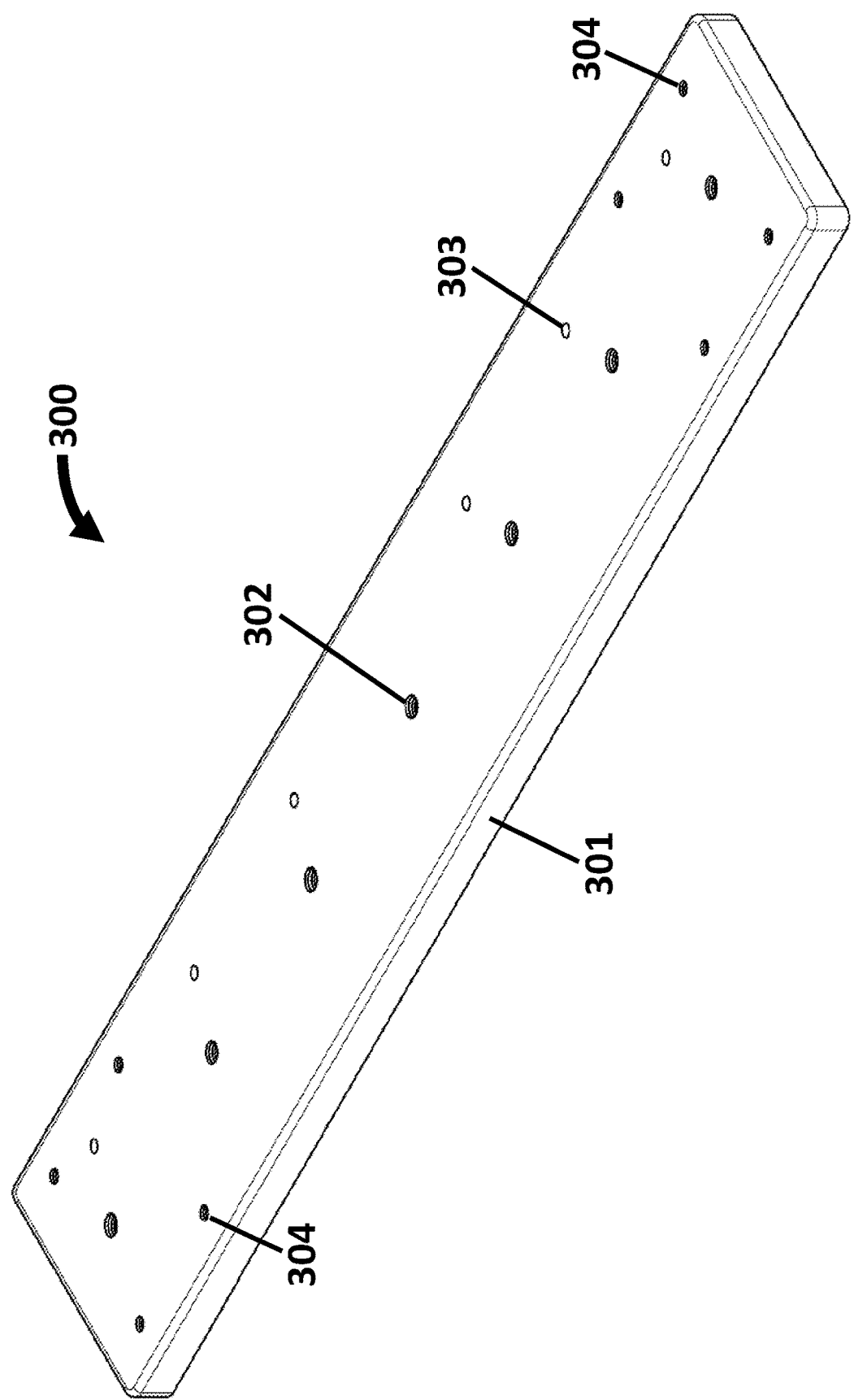
FIG. 6 is a view of a cross-member

The cross-member 300 comprises a cross-member base 301 and a plurality of primary through-holes 302 arranged in a line along the cross-member base, as shown in FIG. 6. The characteristics of these primary holes 302 and optional inserts are identical to the holes 202 of the tray base 201. Furthermore, embodiments of the cross-member 300 may comprise a secondary array of holes 303 along a line offset from the width-centerline of the cross-member base 301. The centers of each of the secondary holes 303 in the preferred embodiment are also not aligned along the length of the cross-member with the closest primary hole 302 and the total number of secondary holes 303 may be less than the total number of primary holes 302.

Yet, each of the secondary holes 303 needs to be located axially close enough to the primary holes 302 and well within the width of the tray base 201; this is so that the primary and secondary holes of the given cross-member base 301 can be lined up to respective holes 202 of the same tray base before passing fasteners through the holes of the cross-member base and tray base. The internal surface topology of the secondary holes 303 may be one of the embodiments described for the tray's holes 202 such as threaded, threaded using an insert, or unthreaded.

The purpose of these secondary holes 303 is to allow another set of fasteners to connect the cross-member base 301 to the tray bases 201; this, in conjunction with the fasteners passing through the primary holes 302 to connect the cross-member base to the tray bases, provides a constraint against any torsional deflection of the rack 100. Without this provision, the rack 100 would tend to deform in a "scissor-like" manner under torsional loading conditions, which in turn would cause cross-member bases 301 to no longer be its preferred orthogonal orientation to each tray base 201, which will also result in each tray base coming closer to another adjacent tray base. The required orthogonal cross-member-to-tray orientation is best shown in FIG. 9.

Figure 9:
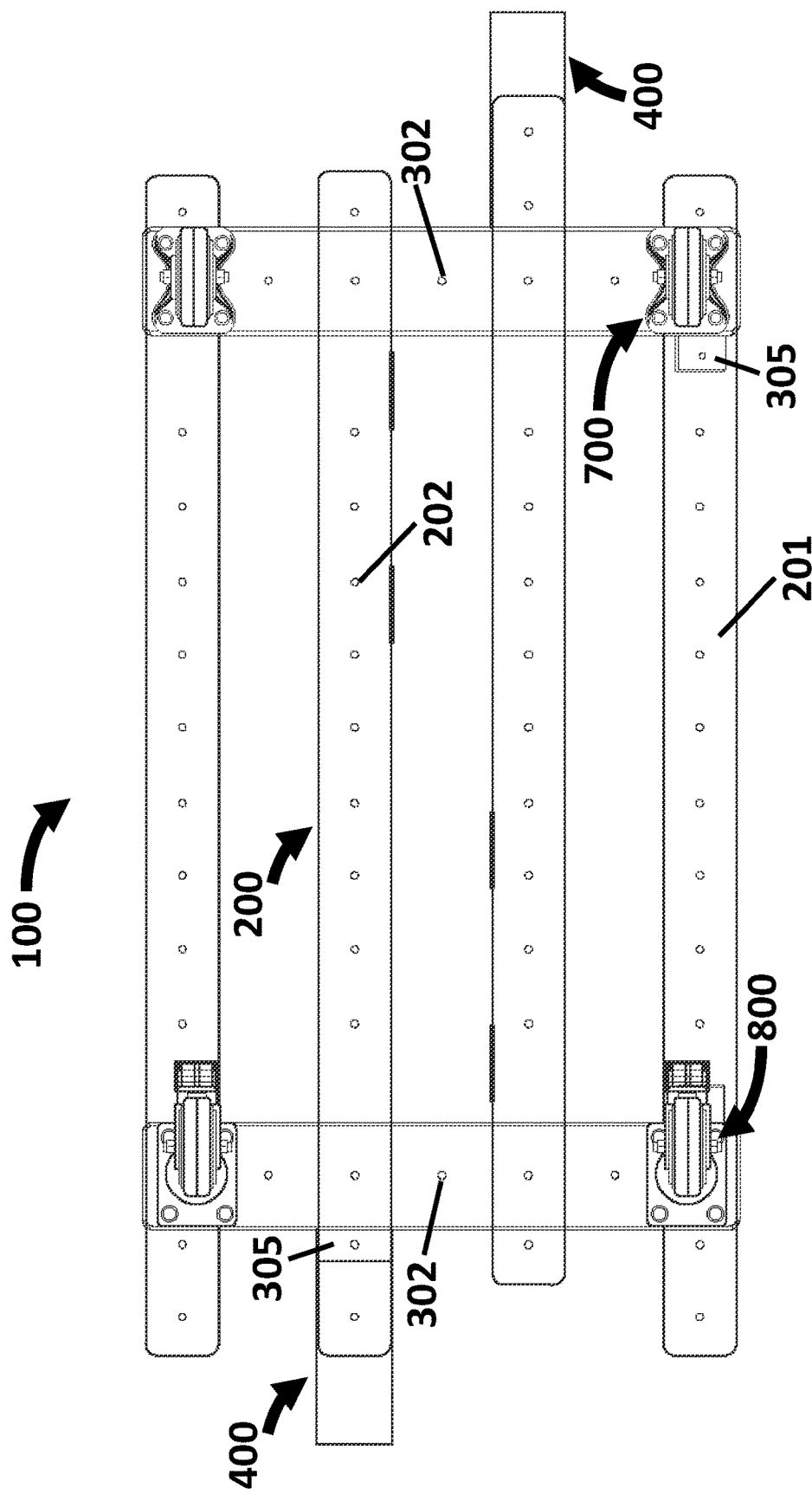
FIG. 9 is an orthographic underside view of the four-tray rack

FIG. 9 also shows an alternative embodiment to resisting torsional deformation of the rack by fastening a lateral joint 305 which is shown to jut out at an approximately orthogonal angle from a portion of a cross-member base 301 fastened to a hole 202 in a tray base 201. This joint 305 is a plate-like extension attached to the cross-member base 301 and has a through-hole that can be aligned to one of the holes 202 of the tray base 201 before passing a fastener (not shown) through both during assembly. To increase torsional resistance, each joint 305 of differing cross-member bases 301 is not attached to the same tray base 201. In the exemplary embodiment, the tray base 201 that is attached to a joint 305 of one cross-member base 301 is not next to the tray base where another joint of another cross-member base attaches.

The pitch or spacing between adjacent tray base holes 202 should be small enough to provide sufficient fineness in the offered adjustability of the mounted longitudinal position of each wheel housing 400 and swing arm assembly 500 on the tray base 201. In the preferred embodiment, the spacing between the center of two adjacent holes 202 along a tray base 201 should be approximately $\frac{1}{10}^{th}$ or smaller than the wheelbase of the target bicycle 600 with the shortest wheelbase intended for parking on the tray 200.

The spacing between the center of two adjacent primary holes 302 along a cross-member base 301 may be in the range of 10% to 50% larger than the width of the tray base 201. The spacing between the center of two adjacent secondary holes 303 in the preferred embodiment is like that of the primary holes 302.

FIG. 3 shows a view of the rack 100 with the exemplary four-tray arrangement. Embodiments of the rack 100 may have fewer or more trays 200. For rack tipping stability considerations, a rack 100 having at least three trays 200 would be preferable. A rack 100 having more than four trays 200 may impose an undesirably large lateral footprint.

Each tray base 201 in the exemplary embodiment is slender, where the length is longer than the maximum wheelbase of the target application vehicle(s) or bicycle(s) 600. As will be mentioned later, the absolute widths range can vary widely depending on the target application vehicle(s) or bicycle(s) 600. Hence, the range of possible widths of the tray base 201 is best described in normalized terms, where the lateral dimension or width of each tray base is generally within a range of 1.15× to 3× the maximum tire width and less than 5× the maximum tire width of the bicycle 600 or vehicle to be parked on said tray 200.

The exemplary embodiments depicted in FIGS. 1-2 show the longitudinal length of the tray base 201 is between the wheelbase and the end-to-end length of the bicycle 600. However, if for example, an application of the rack 100 is intended to store both children and adult bicycles 600, and if the tray bases 201 are all required to be the same length, then the minimum length of the tray base 201 would need to be the maximum wheelbase of the adult bicycle 600 planned for storage. Otherwise, alternative embodiments of the present invention may allow tray bases 201 of various lengths and widths.

The optimal spacing between adjacent tray bases 201 is the minimal dimension needed to prevent geometric interference between bicycles 600 parked on adjacent tray bases 201. Furthermore, the optimal distance between adjacent tray bases 201 can vary based on the target application vehicle(s) or bicycle(s) 600 the rack 100 is designed for because of the differences in maximum width between a children's bicycle, adult's bicycle, e-bike, moped, scooter, and motorcycle.

Accessory attachments like saddle bags may increase the required separation distance between two adjacent tray bases 201. As previously mentioned, and as shown in FIG. 6, the multitude of holes 302, 303 along the length of a cross-member 300 permits the inter-tray base 201 spacing to be adjusted as necessary to avoid geometric interference between two bicycles 600 each parked on adjacent tray bases.

The exemplary embodiment has two wheel housings 400 secured to each tray base 201, where the wheel housings on the same tray base are longitudinally spaced from each other so that each wheel of the parked bicycle 600 of interest is partially in between the wheel housing wings 402 of the wheel housing. The closer the contact point of the bicycle's tire is with the longitudinal center of the wheel housing base 401 of the corresponding wheel housing, the better the wheel housing wings 402 of the wheel housing can prevent the bicycle 600 from tipping over sideways.

The swing arm assembly 500 of each tray 200 should be placed closer to one wheel housing 400 than the other but always between both wheel housings so that the length of each tray 200 and tray base 201 can be minimized. In the exemplary embodiment, the swing arm assembly 500 is placed closer to the wheel housing 400 for the front wheel of the bicycle 600. The swing arm assembly 500 is situated relative to the closest wheel housing 400 at a distance that allows the swing arm 501 to be approximately perpendicular to the tray base 201 when the wheel-securing assembly wings 502 and swing arm 501 are coupled to the wheel/tire, as shown in FIGS. 1 and 2. The proper distance from the swing arm assembly 500 to the nearest wheel housing 400 on the same tray 200 depends on the rolling radius of the wheel/tire assembly on the nearest wheel housing and the position of the swing arm assembly on the tray base 201 is adjustable in the same manner the wheel housing.

Figure 4:
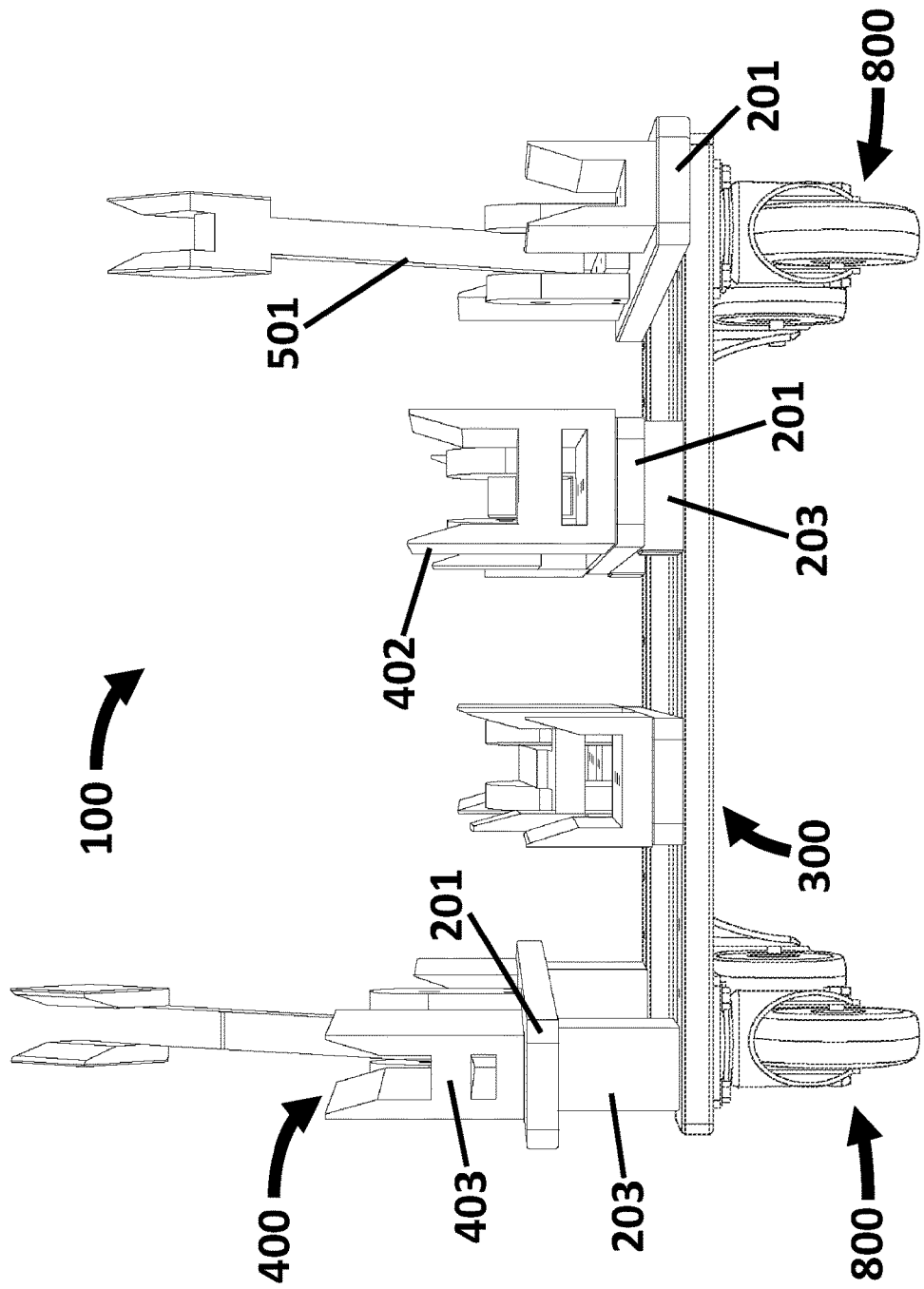
FIG. 4 is a perspective end-on view from one of the longitudinal ends of the four-tray rack

At the distal longitudinal ends of the preferred embodiment of one wheel housing 400 per tray 200 is a pair of wheel chocks 403 (as shown in FIGS. 3-4) integrated with the wheel housing 400. These wheel chocks 403 help keep the bicycle 600 secured longitudinally on the tray 200.

Each wheel chock 403, in one of the embodiments of such, can be a block-like lateral element between the wheel housing wings 402 of the wheel housing and some distance above the wheel housing base 401 of the wheel housing but below half-height of the wheel housing wings 402. The average cross-sectional width or diameter of the chock 403 is preferably about an inch but can be in the range of 0.4 inches to 2 inches for trays 200 intended for bicycles 600. In the preferred embodiment of the rack 100, the wheel housing 400 with the chocks 403 is that for the front wheel of the bicycle 600, and the wheel housing for the rear wheel of the bicycle may not have wheel chocks because such may not be needed.

Typically, bicycles 600 are widest at the handlebar portion. This significantly limits packaging efficiency if all bicycles 600 are oriented in the same direction (e.g., having the front of each vehicle on the same side of the rack 100).

The present invention overcomes this packaging concern with several provisions. The first is how the alternating orientation of the bicycles 600 is enforced for the exemplary embodiment. This is apparent in FIGS. 3-4, which show the front wheel housings 400 with the wheel chock 403 that are placed at alternating ends of the rack 100.

Figure 5:
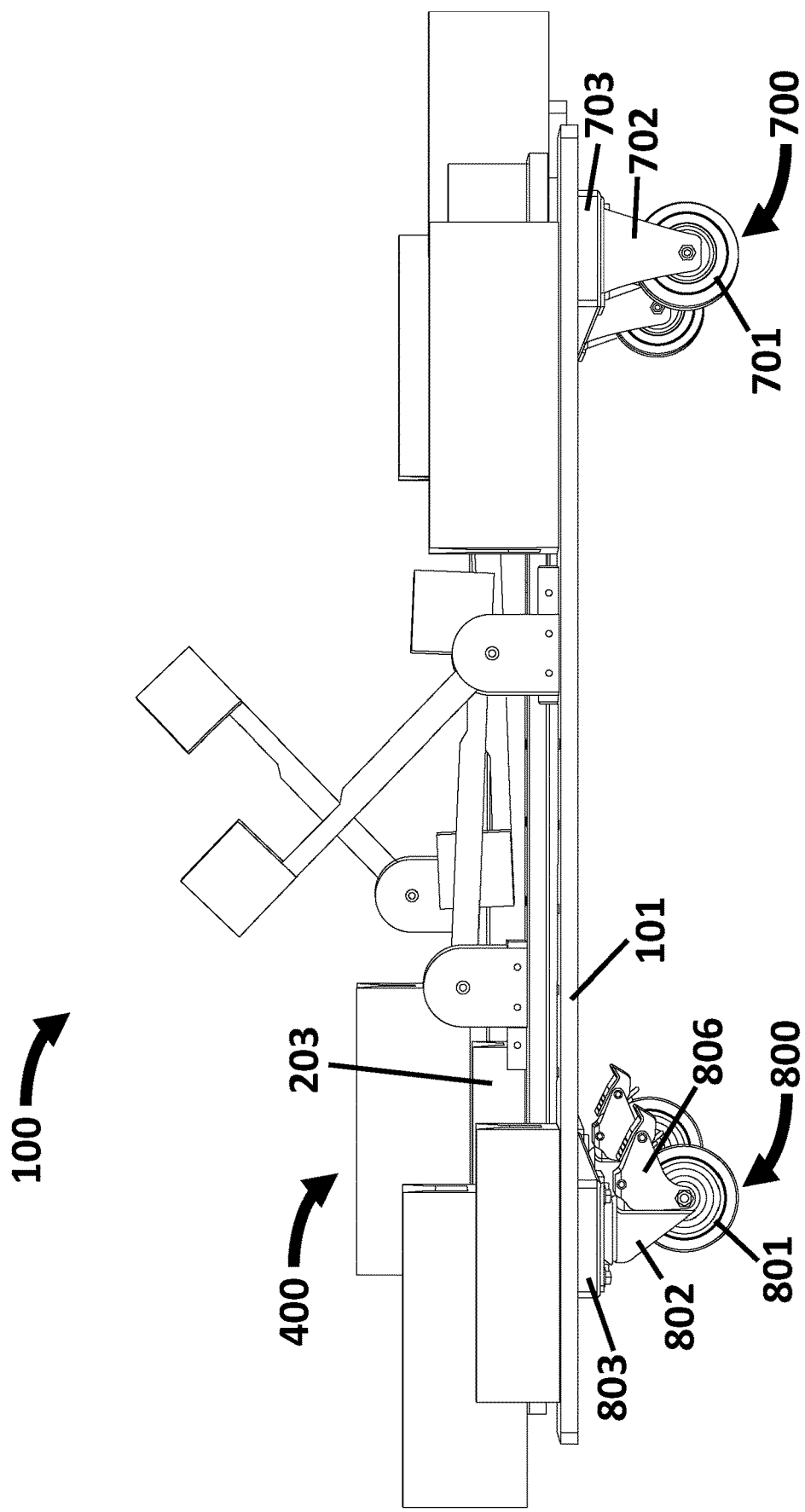
FIG. 5 is a perspective side-on view of the four-tray rack

The second provision to promote packaging efficiency is depicted in FIGS. 3-5, as a plurality of spacers or riser blocks 203 to set the final height of a tray 200 and a bicycle 600 parked on the tray. These riser blocks 203 help prevent interference between pedals, handlebars, seat, and other parts of one bicycle 600 parked on a tray 200 at one height with those of an adjacent bicycle on a tray base at a different height; this arrangement ultimately allows for even smaller inter-tray spacing and smaller overall footprint of the rack 100. These riser blocks 203 are placed on the base 301 of each cross-member where one tray base 201 is to be placed. The raised tray base 201 is placed on the top of the riser block 201.

With the exemplary embodiment, more than one height of riser blocks 203 can be used for each rack 100, but one riser block height is preferably used per raised tray base 201. Tray-to-adjacent-tray height distinction may also be accomplished by having one tray base 201 sit directly on a cross-member without any riser block 203 and one or more adjacent tray bases 201 perched on riser blocks 203.

These riser blocks 203 are attachable to the base 301 of each cross-member and each tray base 201 by any number of methods. One way is to have riser blocks 203 with one or more holes (not shown) some distance inward from the mating surfaces of the riser blocks, where the mating surfaces include the surface that interfaces with the upward-facing side of the base 301 of a cross-member and the other surface that mates with the underside of a tray base 201. Referring again to FIG. 10, the two fastener holes for the exemplary riser block 203 are apparent and the holes of the riser block are spaced apart like the holes 202 in the tray base 201. Each of these riser block fastener holes may be threaded or contain a threaded insert so a bolt or screw (not shown) may be disposed through each hole of the base 301 of a cross-member or tray base 201 that is aligned with each hole of the riser block 203 and engage the threads of the riser block.

Alternatively, one or more post(s) or dowel pin(s) pressed in and fixed to hole(s) in the riser block 203 may extend outward normal from each of the riser block's mating surfaces (not shown). These post(s) or dowel pin(s) can be disposed through aligned hole(s) of the tray base 201 and or base 301 of the cross-member.

Alternative embodiments may have the outer surface of each fastener post of the riser blocks 203 be threaded. For these embodiments, the length of each fastener post needs to be longer than the thickness of the structure (tray base 201 or base 301 of cross-member) so that the threaded post can protrude below the bases 201, 301 and fastening nuts may be used to secure the riser blocks 203 with the tray base 201 and base 301 of the cross-member. A lock washer may be used between a nut or the head of a bolt or screw and any structural member of the present invention to help maintain fastener preload.

FIG. 4, which is a perspective end-on view from one of the longitudinal ends of the four-tray rack closest to the cross-member 300 with the swivel casters 800. This figure also shows a portion of the two inside facing surfaces of the wheel-securing assembly wings 502 of a couple of swing arm assemblies and the wings 402 of several wheel housings, which are tapered and splay out toward the open end. This splayed-out taper of the inner facing surfaces of the wings 402, 502 starts between the approximate halfway point of both wings, where the wings are secured and the open end. The inside facing surfaces are substantially parallel to each other from the plane where the wings 402, 502 are attached up to the start of the taper.

The splayed-out portion of the inside facing surfaces helps guide a wheel of the bicycle 600 into the slot between the wings 402 of the wheel housing or guide the slot between the wheel-securing assembly wings 502 around a wheel/tire of a bicycle. The parallel inside facing surfaces provide a close grip on a wheel/tire as long as the minimum width of the slot between the wings 402, 502 is approximately the same or slightly larger than the width of the wheel/tire; slightly larger in this context would mean preferably less than a third of the tire width if the bicycle 600 has mountain biking tires or approximately a tenth to a few tenths of an inch greater than the tire or outer rim width if the bicycle has narrow road tires.

FIG. 5 shows a perspective side-on view of the four-tray bicycle rack 100. Each swing arm assembly 500 is shown to be near one of the wheel housings 400 for each tray 200. The height differences between different trays 200 that are established by riser blocks 203 as well as the presence of casters 700, 800 to make the rack 100 both rollable and maneuverable are depicted in this figure.

CASTERS: FIGS. 5-10 illustrate the preferred embodiment of the fixed 700 and swivel 800 casters and show how each is attached to each base 301 of the cross-member of the rack 100. Each fixed 700 and swivel 800 caster comprises a wheel 701, 801, a stem 702, 802, and a caster mounting flange 703, 803. Each stem 702, 802 is plate-like and comprises a through-hole on both lateral portions to hold a shaft that also passes through the hub of the wheel 701, 801.

The stem 702 of the fixed caster connects orthogonally to the plate-like mounting flange 703. Embodiments of each stem 702 and mounting flange 703 of the fixed caster may be constructed from a single stamped piece.

The stem 802 of the swivel caster connects orthogonally to a swivel plate 805 that is rotatable and constrained by a plurality of ball bearings in a raceway (not shown). This raceway is integrated within the center cutout of the plate-like mounting flange 803 that accommodates the swivel plate 805. Swivel casters 800 with swivel plates 805 are the preferred embodiment for the exemplary rack 100 for their low (i.e., flat) profile as opposed to yoke-type swivel casters (not shown) that require some notable height to accommodate a yoke.

Each caster mounting flange 703, 803 has a plurality of through-holes for fasteners to pass through. Embodiments of the swivel caster 800 may further comprise caster brakes 806 that can be used to "bite" into the rolling portion of the wheel 801, to help prevent the rack 100 from rolling.

In the preferred embodiment, the underside of the base 301 of each cross-member has a plurality of threaded holes 304 placed near the lateral distal extents and arranged where all holes 304 can be aligned to the holes of the caster mounting flanges 703, 803. A plurality of bolts 704, 804 or screws are used to fasten the mounting flange 703, 803 and therefore the caster 700, 800 to the base 301 of each cross-member.

Figure 7C:
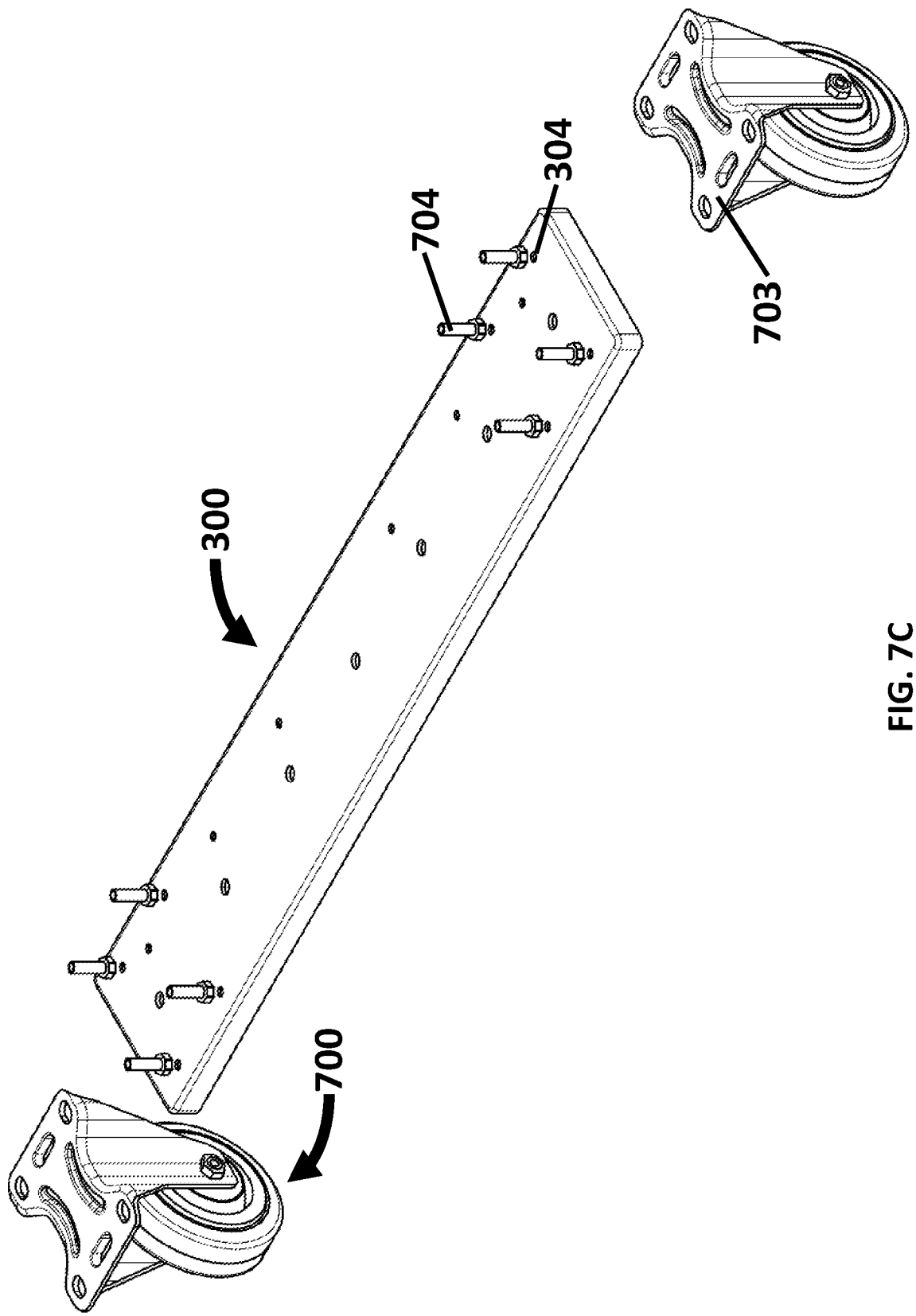
FIG. 7C is an exploded view of the cross-member, a pair of fixed casters, and four bolts for fastening each caster to the cross-member's base
Figure 8C:
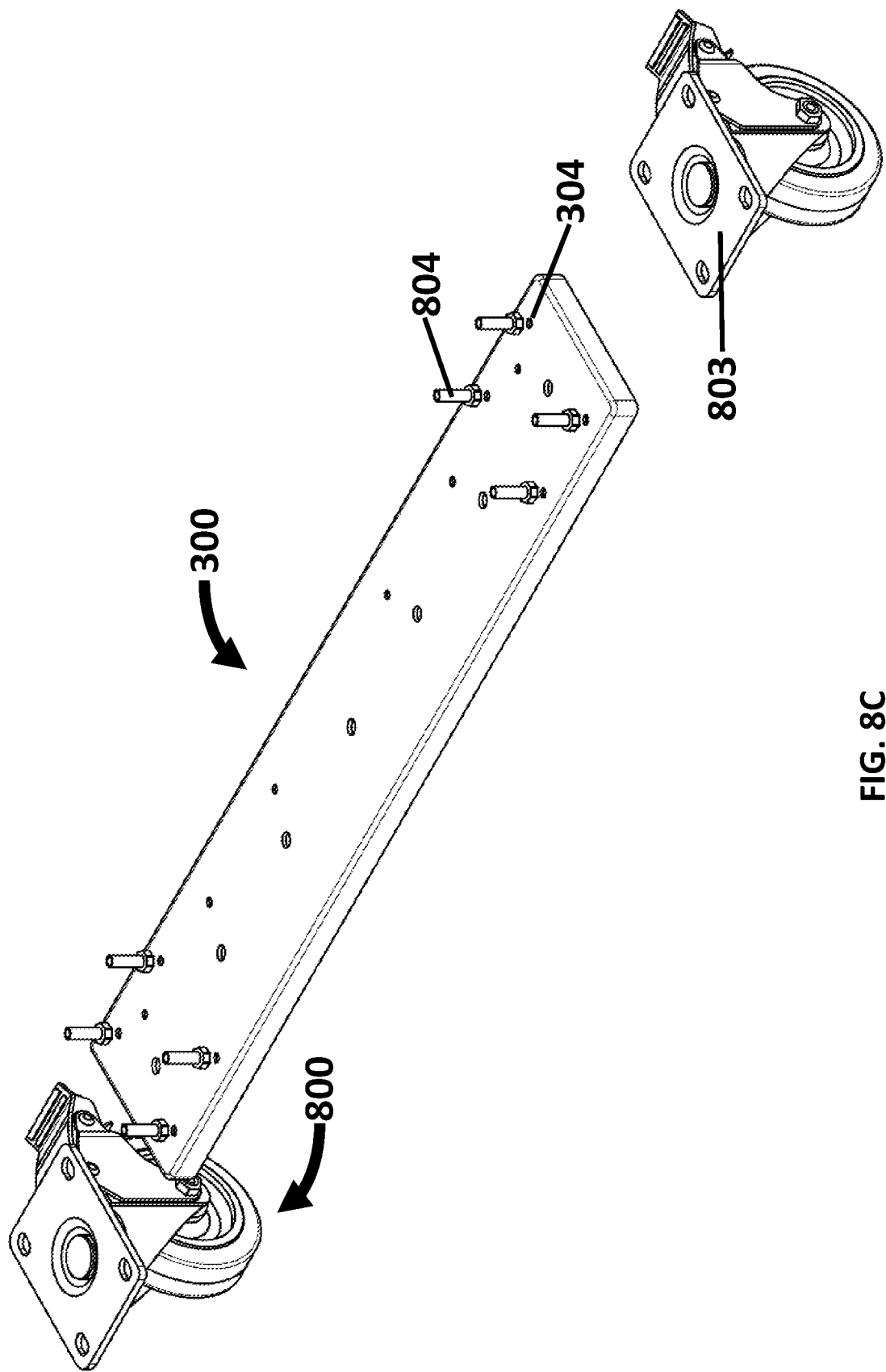
FIG. 8C is an exploded view of the cross-member, a pair of swivel casters, and four bolts for fastening each caster to the cross-member's base
Figure 10:
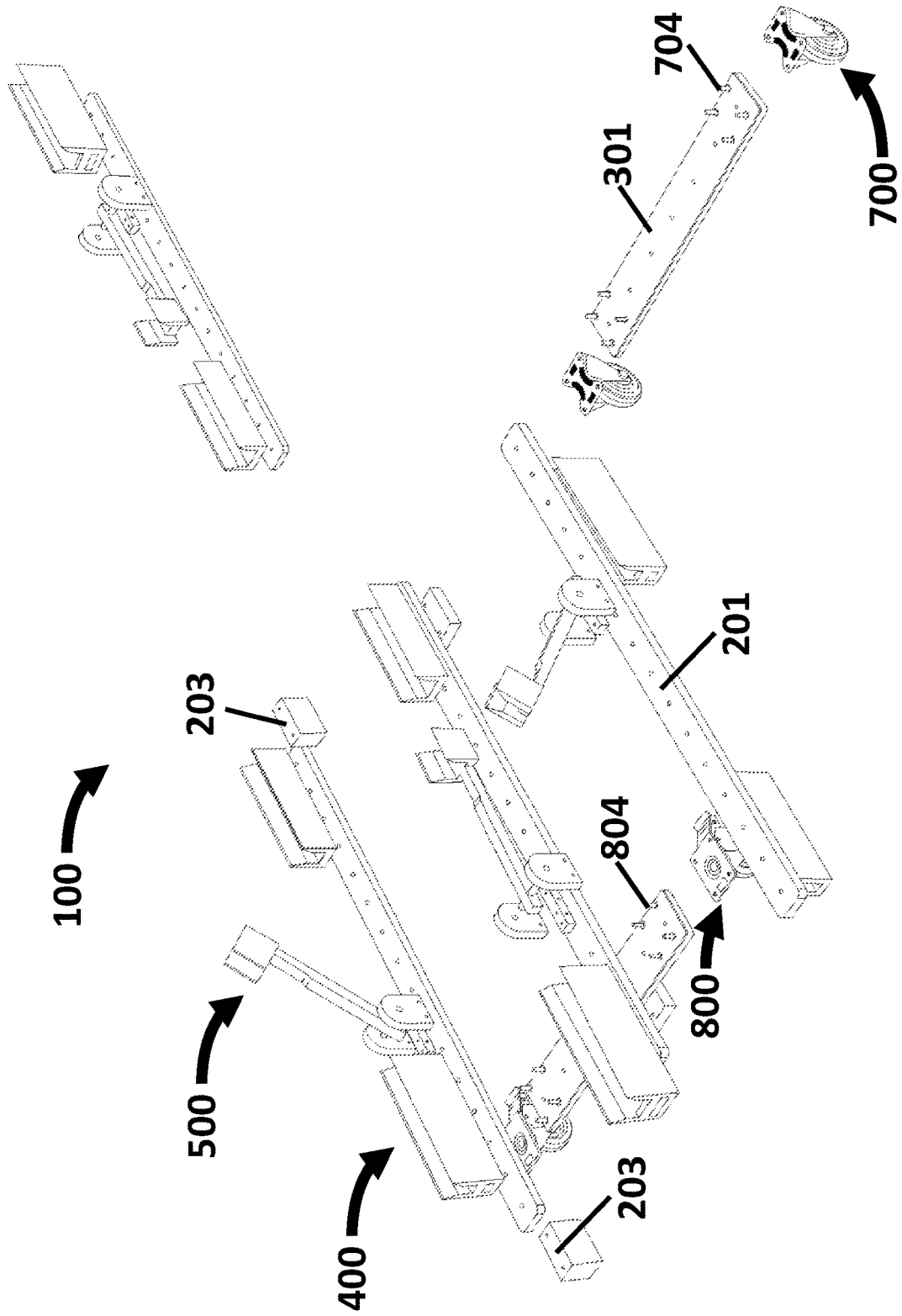
FIG. 10 is an exploded view of the four-tray rack

For illustration purposes only, FIGS. 7C, 8C, and 10 show bolts 704, 804 in an exploded assembly view above the cross-member base 301 and respective casters 700, 800. During assembly, the bolts 704, 804 are passed through from the bottom of their respective mounting flanges 703, 803 and into the threaded holes 304 at the underside of the cross-member base 301. The preferred embodiment of the present invention has one caster type placed on each cross-member base 301; in other words, a fixed 700 and swivel 800 caster will not be both attached to the same cross-member base 301.

As previously mentioned, another type of swivel caster (not shown) which has a fork connected to a yoke that is rotatable within a long cylindrical housing may obviate the need for caster fasteners 704, 804 and dedicated caster mounting flange fastener holes 304, but the length of the yoke and bearing housing would require longer tray bases 201 and the casters 700, 800 to be attached at the far distal ends of the tray bases so that the yoke and bearing housing can extend above the tray base where no bicycle wheel/tire is expected to occupy. This would result in a larger overall rack footprint than the earlier described exemplary embodiment.

Referring again to FIG. 9 which shows the underside of a four-tray embodiment of the rack 100, the exemplary embodiment of the rack 100 comprises four substantially parallel tray bases 201 and two cross-member bases 301 arranged orthogonally to said tray bases. Fasteners as previously mentioned (but not shown) couple the cross-members bases 301 to the tray bases 201. The center two trays 200 each show a wheel housing 400 jutting out from the extent of the tray bases 201 to accommodate long wheelbase vehicles (not shown) parked on those two trays.

In addition to an alternating tray/vehicle orientation and the use of riser blocks 203, the third provision to promote a compact rack footprint is the possibility for tray bases 201 to be coupled to the cross-members bases 301 at varying or staggered fore-aft longitudinal positions. This is illustrated by the distinct longitudinal position of the tray base 201 which is the second from the bottom tray base in FIG. 9.

Figure 11:
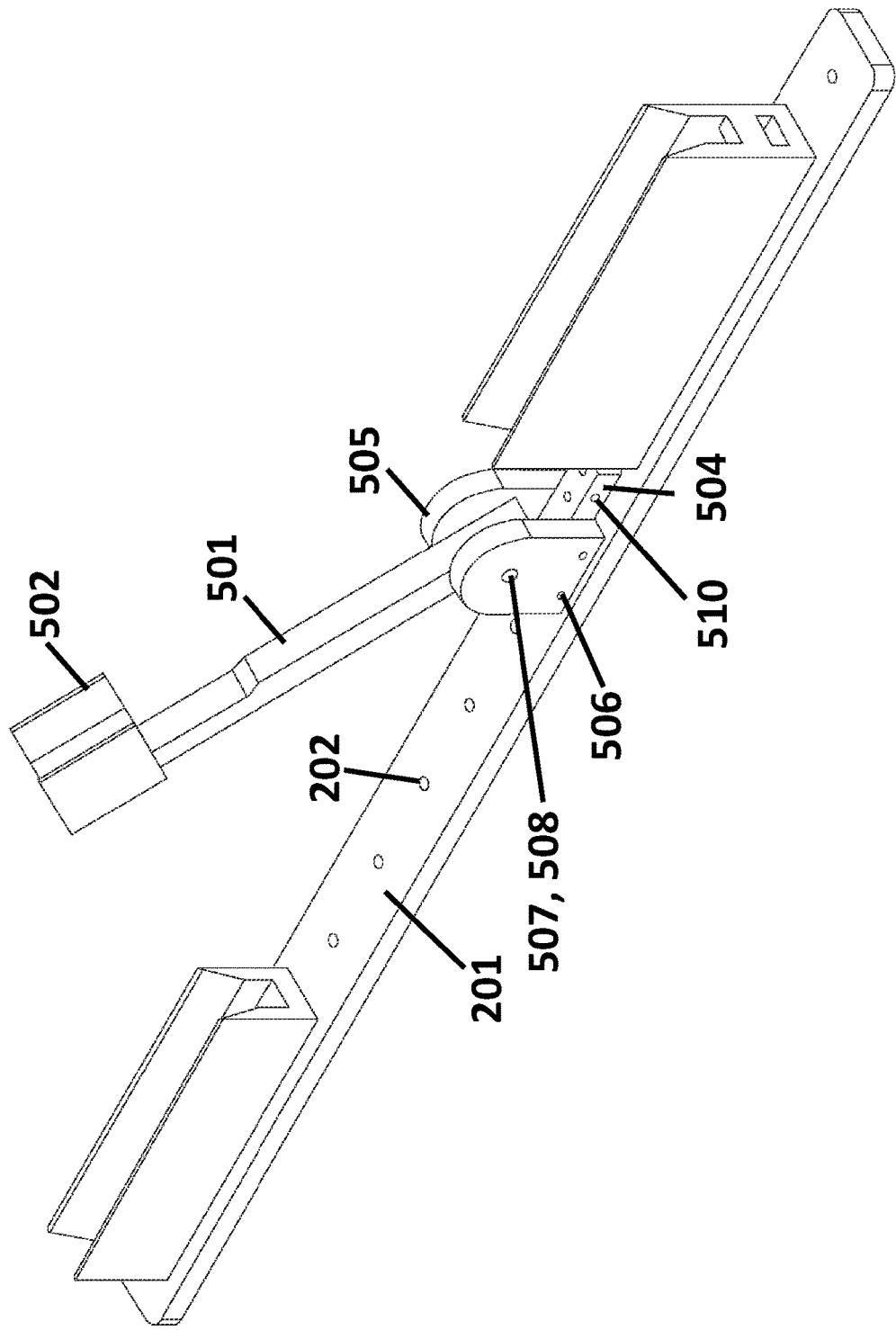
FIG. 11 is a view of a single tray
Figure 12:
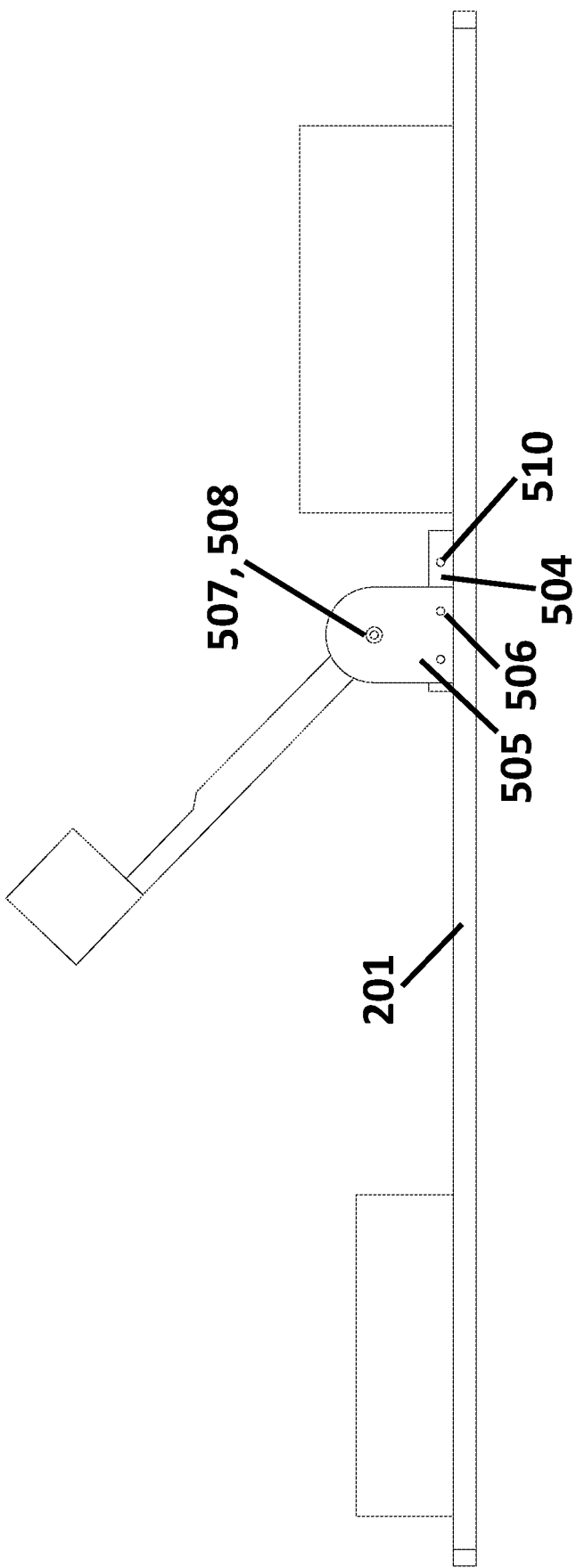
FIG. 12 is an orthographic side-on view of the single tray
Figure 13:
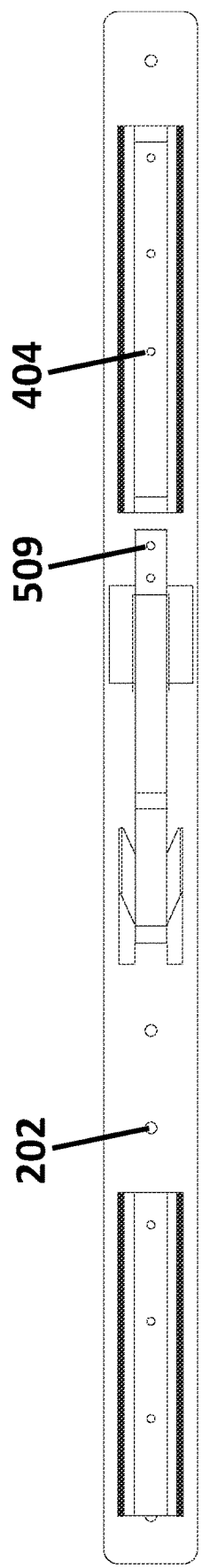
FIG. 13 is an orthographic overhead view of the single tray
Figure 14:
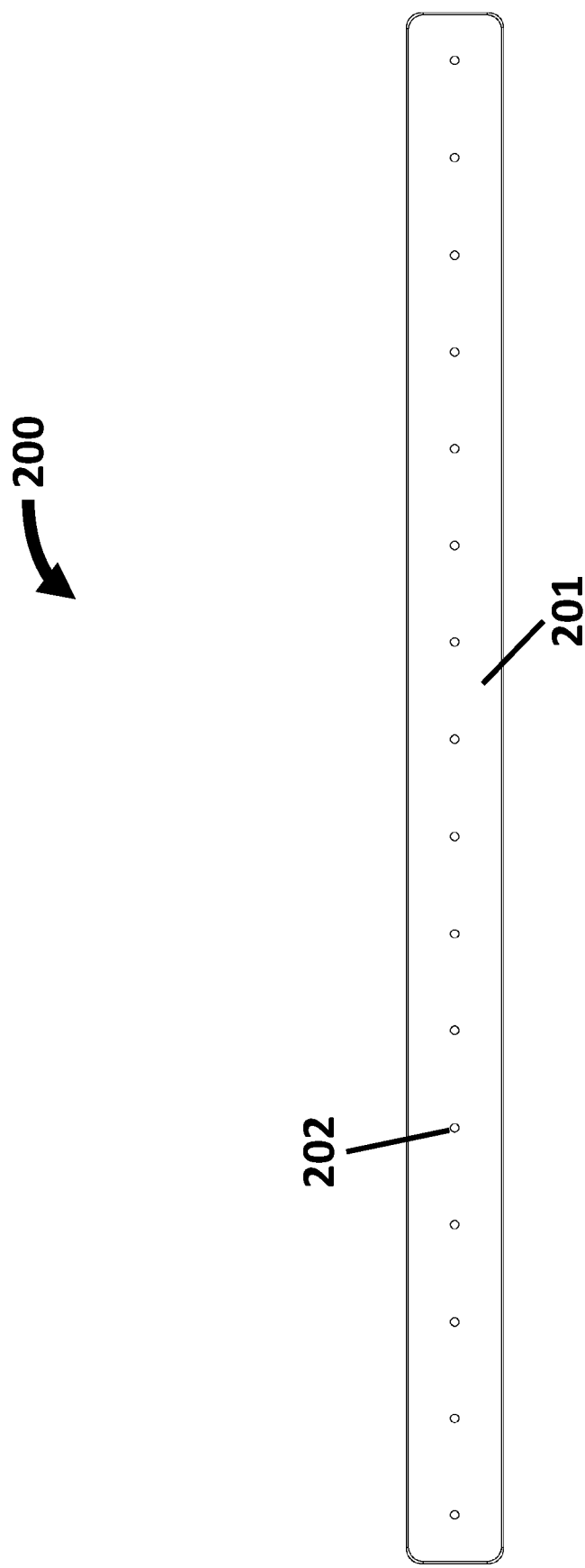
FIG. 14 is an orthographic underside view of a tray base of a single tray

TRAY AND TRAY COMPONENTS: FIGS. 11-14 show varying views of the tray 200, wheel housings 400, and swing arm assembly 500 minus the fastener strap 503. FIGS. 11-13 show an embodiment of the swing arm assembly 500 in detail, which further comprises a swing arm assembly base 504, a pair of pin bore housings 505, a plurality of pin bore housing mounting through-holes 506, a pin bore 507, and the swing arm pin 508.

The swing arm assembly base 504, which has vertical fastener through-holes 509 whose centerline spacing between two adjacent holes 509 are spaced identically that of the holes 202 in the tray base 201 because the swing arm assembly base is intended to be attachable to the tray base. If the tray's holes 202 are threaded, then the fastener needs to have a threaded shaft at its bottom portion engaging the tray hole 202. Appropriate fasteners in his case would be bolts or screws. A lock washer may be used between the head of the screw or bolt and the swing arm assembly base 504 to help maintain fastener preload.

FIG. 12 shows an orthographic side-on view of the exemplary single tray. This figure shows an embodiment whose front wheel housing with a chock is taller than the rear wheel housing without the chock.

Orthogonal to the vertical though-holes 509 of the swing arm assembly base, are a plurality of fastener side holes 510 whose centerline spacing between two adjacent holes 510 are spaced identically to that of the pin bore housing's through-holes 506. The side holes 510 of the swing arm assembly base 504 need not be through holes. The purpose of these holes 506, 510 is for fasteners to anchor the pin bore housings 505 to the swing arm assembly base 504.

The swing arm 501 preferably has a through-hole (not shown) so the pin 508 can be disposed through the pin bores 507 of both pin bore housings 505 as well as a through-hole across the width at a point along the swing arm 501. The pin 508 can be retained by any one of the elements comprising a c-clip, retainer ring, or interference fit between the pin 508 and pin bores 507. If the pin 508 is fixed with the pin bores 507, the through-hole of the swing arm must have enough radial clearance from the pin to allow the swing arm 501 to swing freely. Alternatively, the pin 508 may be fixed with the swing arm 501, which means the radial clearance of the pin bores 507 from the pin needs to be sufficient to allow the swing arm 501 to swing freely.

FIG. 13 shows an orthographic overhead view of a single tray 200. This figure shows the mounting through-holes 404 of the wheel housing whose centerline spacing between two adjacent holes 404 are spaced identically to that of the holes 202 of the tray base 201. Embodiments of the mounting wheel housing through-holes 404 may also be countersunk to allow the head of the screw or bolt to not protrude above the surface of the wheel housing base 401.

FIXED WIDTH WHEEL HOUSING: The illustrations of earlier figures (FIGS. 1-5, 10-13) focus on the larger-scale features of the wheel housing 400 and the rest of the rack 100. The wheel housing 400 described so far also represents a fixed-width embodiment designed to fit a limited range of wheel/tire widths without being inadequately narrow or having excessive clearance.

Figure 15:
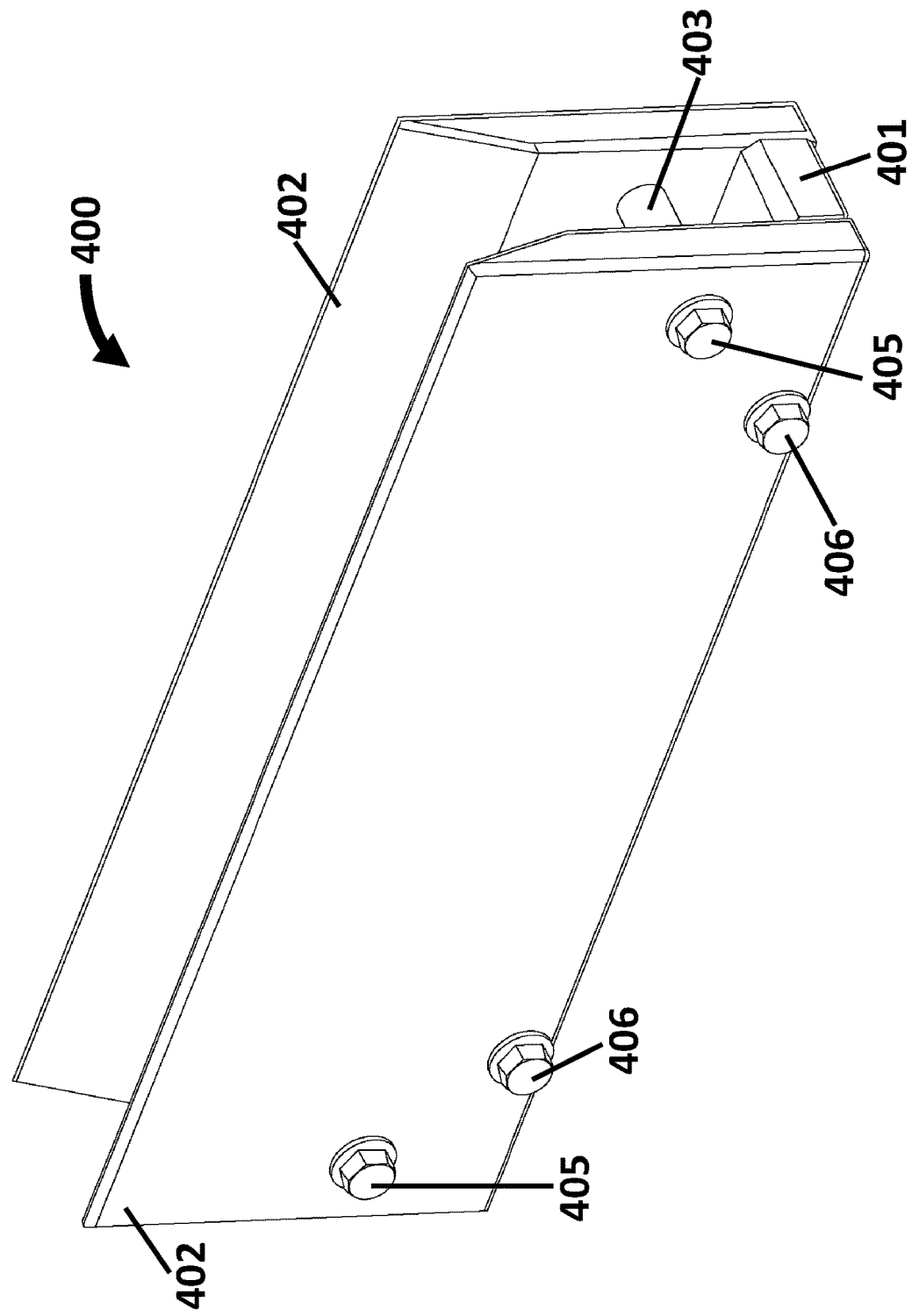
FIG. 15 is a view of a slotted wheel housing
Figure 16:
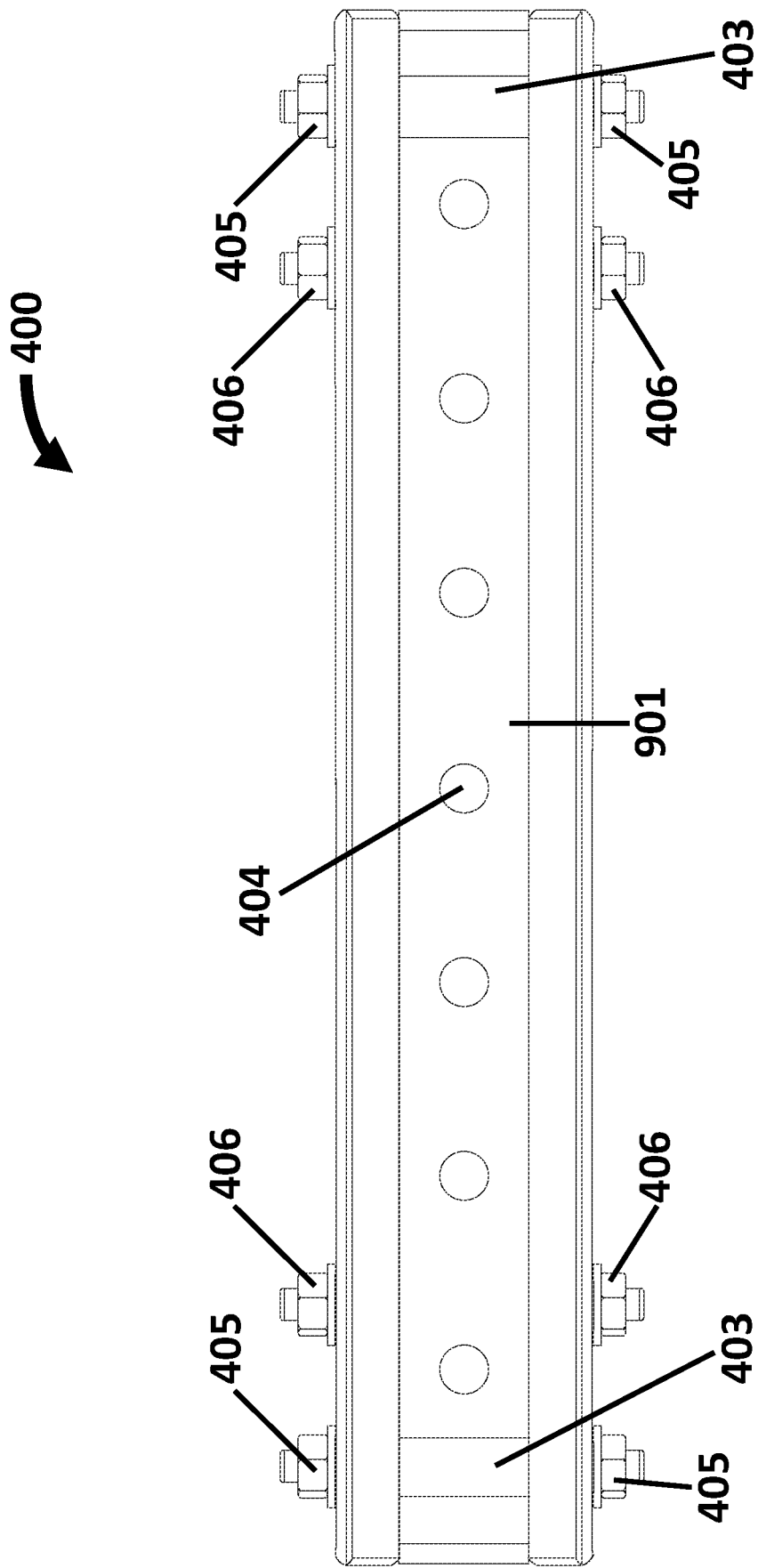
FIG. 16 is an overhead of the slotted wheel housing

FIGS. 15-16 show two views of a fixed-width embodiment of the wheel housing 400 with additional illustrated features to convey other aspects of the fixed wheel housing not previously described. These figures clearly show the wheel housing base 401 along with the pair of wheel housing wings 402, each with tapered upper facets. The wheel housing base 401 fills out the space between the inside-facing surfaces of the wheel housing wings 402 at the bottom of the wings. A pair of wheel chocks 403 in the depicted embodiment are simply cylindrical shafts approximately halfway up the wing's vertical dimension and are each situated at opposite longitudinal distal ends of the wheel housing 400. The cylindrical wheel chock 403 form is an alternative embodiment to the two different block-link chock profiles shown in FIGS. 1, 3, 4, 10, 11, and 13. The first block-like chock embodiment is shown in FIG. 1 as a fastened-on lateral element placed at approximately the same height as the cylindrical embodiment. FIGS. 3, 4, 10, 11, and 13 show the block-like chock 403 that is integrated with the wheel housing's wings 402. The integrated chock 403 embodiment may be formed through a casting or molding process.

Each cylindrical wheel chock 403 of the embodiment that is shown in FIGS. 15-16 is held in place by a fastener 405 such as a bolt or screw disposed through a through-hole of each wheel housing wing 402. The exemplary wheel housing wing 402 has four such through-holes to accommodate the fasteners 405 of the wheel chock. The wheel housing base 401 is held in place by fasteners 406 such as bolts or screws, each disposed through through-holes of each wheel housing wing 402. Alternative embodiments of attaching the wheel chock 403 may comprise being molded/cast, glued, pinned, or rivited with the wheel housing wings 402.

Figure 17:
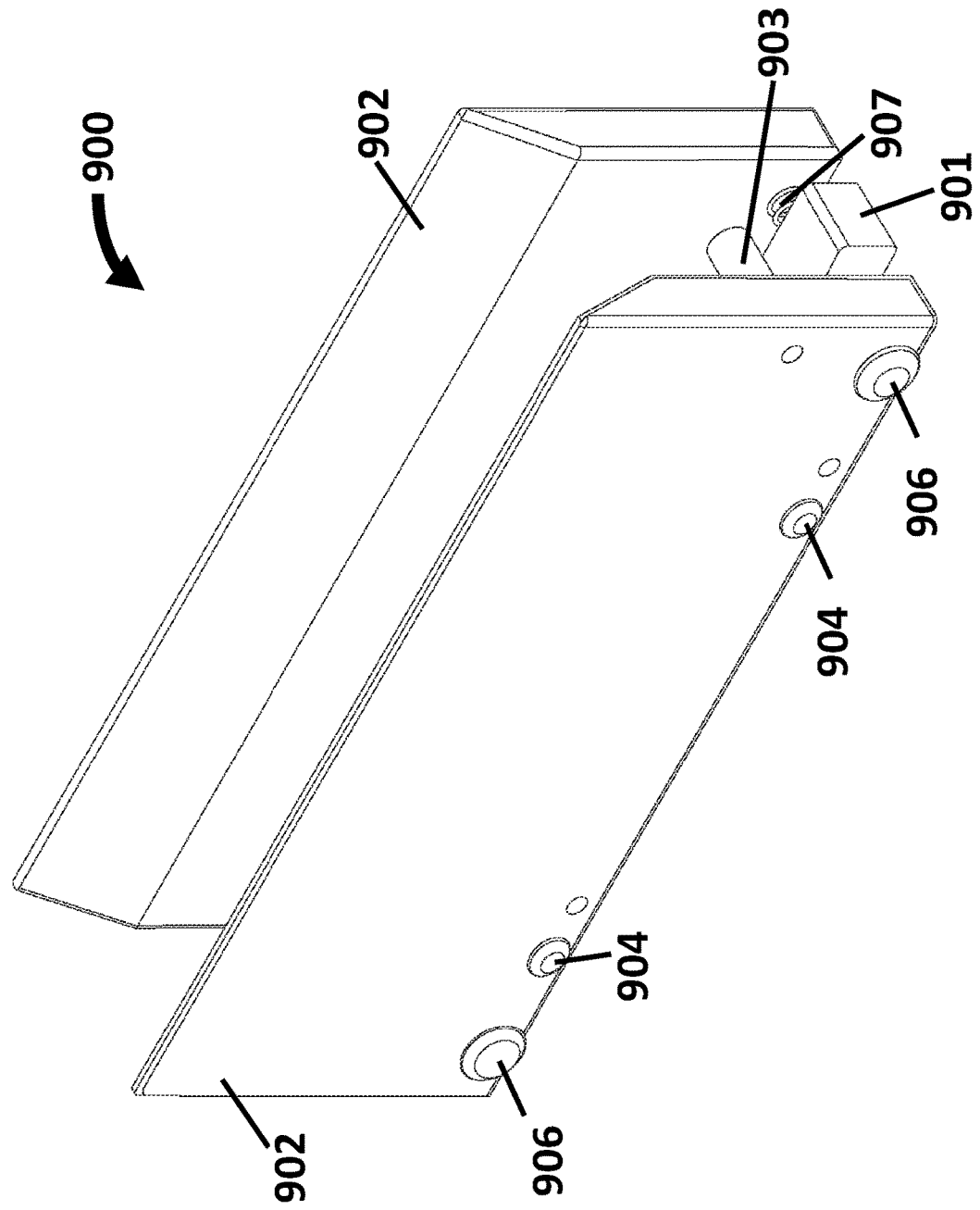
FIG. 17 is a view of an adjustable slotted wheel housing
Figure 18:
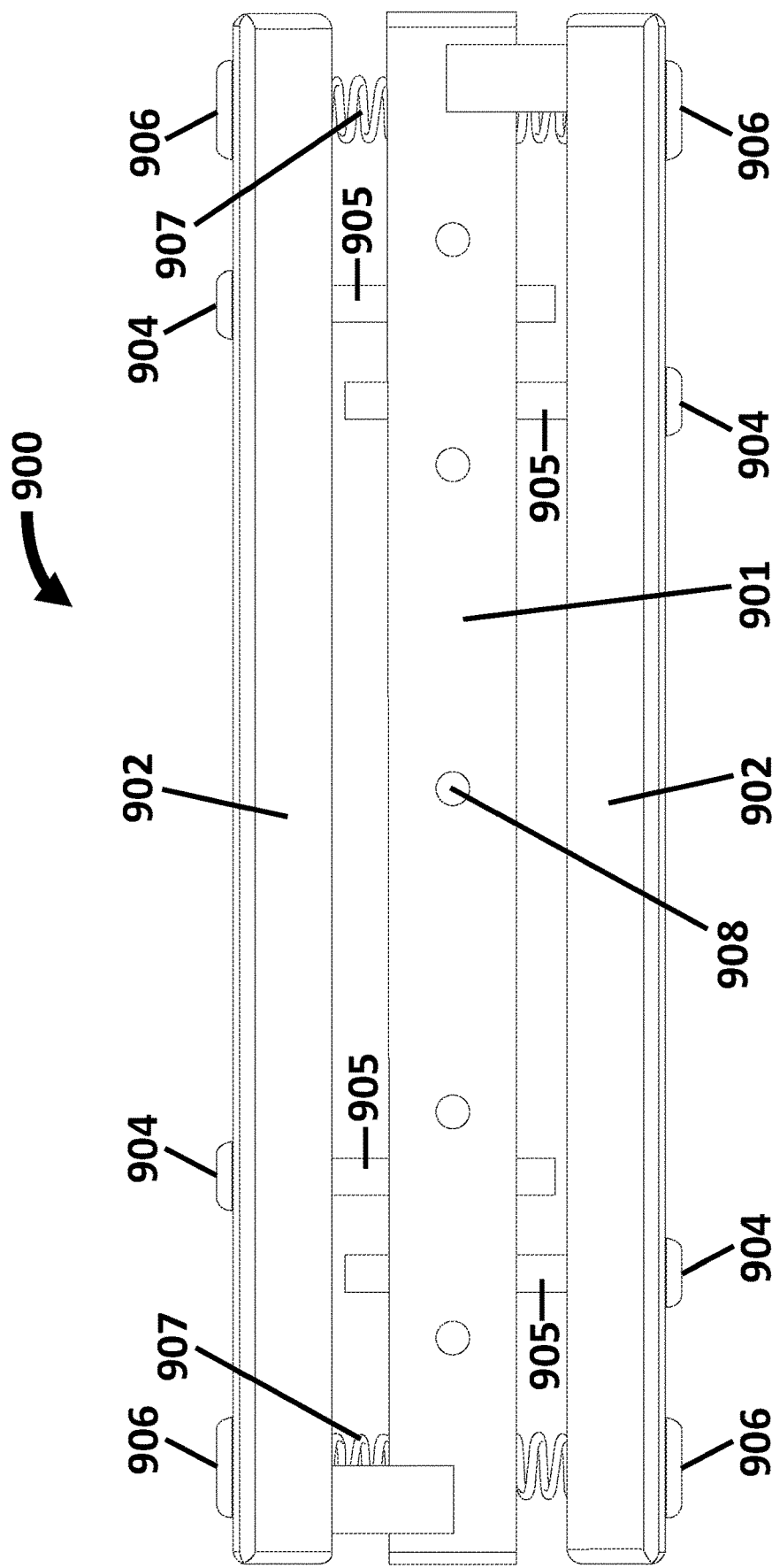
FIG. 18 is an overhead view of the adjustable slotted wheel housing

ADJUSTABLE WIDTH WHEEL HOUSING: FIGS. 17-18 show an alternative embodiment of a wheel housing 900, where the position of each wheel housing wing 902 relative to one another and the wheel housing base 901 is adjustable. The geometric spacing and internal topology of the wheel housing base through-holes 908 are analogous to the holes 404 of the fixed-width embodiment of the wheel housing base 401.

The wheel chock 903 of the adjustable width wheel housing embodiment is only as long as the width of the wheel housing base 901 and is integrated (i.e., molded or cast) or attached (i.e., glued, screw fasteners, riveted, pinned, etc.) to only one of the wheel housing wings 902. The exemplary embodiment of this wheel housing 900 has the wheel chock 903 at one distal end attached to one of two wheel housing wings 902 and the wheel chock at the opposite distal end to the other wing, as shown in FIG. 18.

A plurality of guide pins 905 that guide the lateral motion of the wheel housing wings 902 are also shown in FIG. 18. The guide pins 905 are disposed through holes of the wheel housing wings 902 and the wheel housing base 901. Each guide pin 905 of the exemplary embodiment has an end cap 904 that can serve as a surface for a mallet to impact during installation. The guide pins 905 are preferably interference-fitted with the holes of the wheel housing wings that hold the guide pins 905. The outer diameter of each guide pin 905 is however smaller than the inner diameter of the through-holes (not shown) of the wheel housing base 901 that accommodate the guide pins 905 so the pins can freely move relative to the wheel housing base 901 when the wheel housing wings 902 are moved laterally.

Near each distal end of the adjustable wheel housing 900 is an assembly comprising an end cap 906, spring 907, and another end cap 906. The spring 907 is in a rested (un-stressed) state when the inner-facing surfaces of the two wheel housing wings 902 are closest together and separated apart by no less than the width of the wheel housing base 901. Therefore, the springs 907 when stretched, provide a closing force to help keep the wheel housing wings 902 in contact with the wheel/tire of the bicycle 600 for a range of wheel/tire widths. A preferred width of the wheel housing base 901 may be that of the conceivable narrowest tire targeted for use, such as a road tire width, which can start at less than 0.9 inches. The maximum slot width between the inner facing surfaces of the wheel housing wings 902 may be up to the widest tire targeted for use (~5 inches for all-season trail riding mountain bike tire) in the market. The range of slot widths may be narrower if the targeted use of the adjustable wheel housing 900 is narrower. For example, the range of slot widths may be 0.8 to around 2.5 inches.

Figure 19:
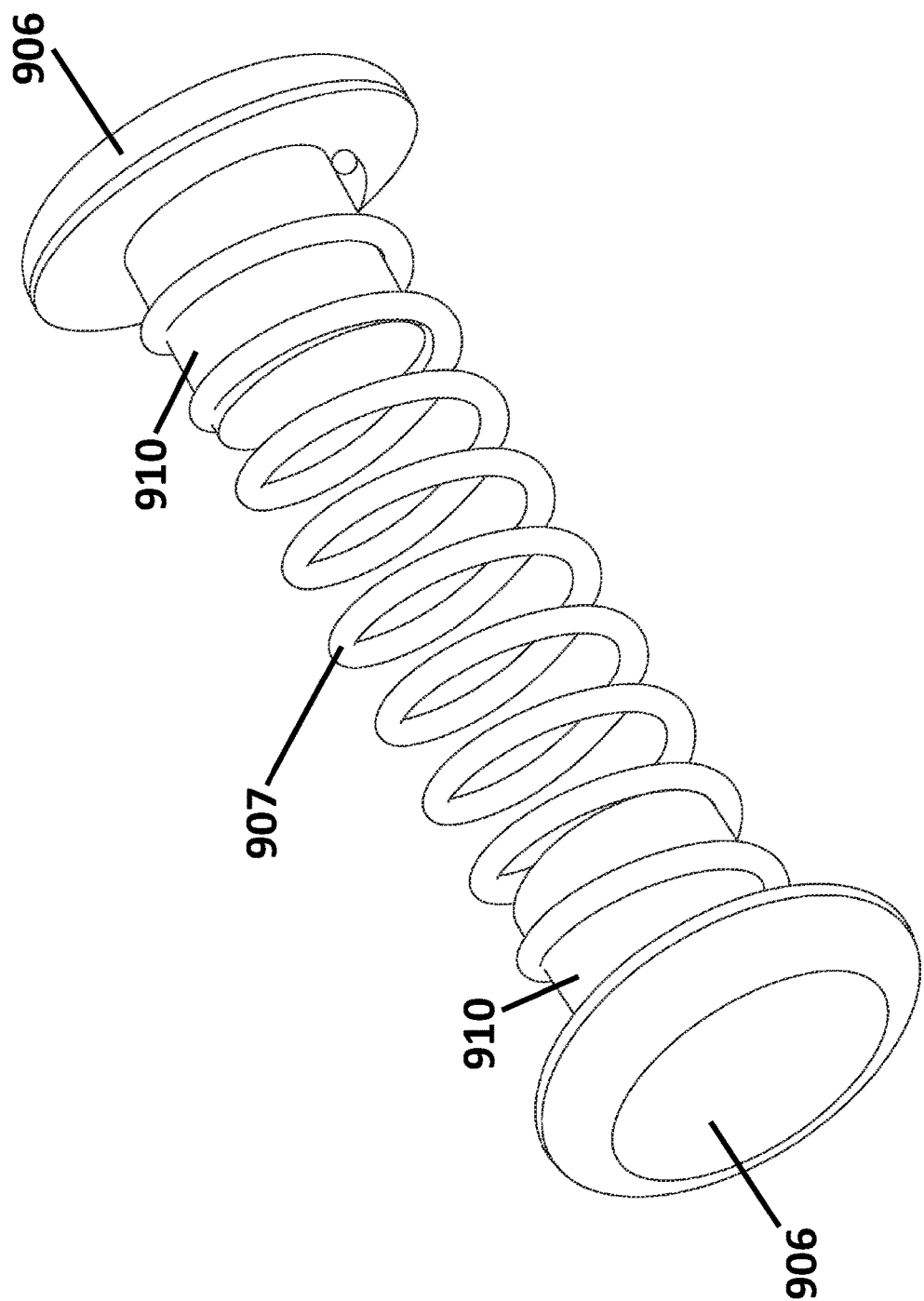
FIG. 19 is a view of an end cap/spring/end cap subassembly for the adjustable slotted wheel housing

FIG. 19 shows the spring 907 and end cap 906 pair. In the preferred embodiment, each end cap has a threaded (threads not depicted) shank portion 910 that is dimensioned so that the spring can be screwed onto the shank. Alternatively or furthermore, the shank 910 may be further shaped like a cone (not depicted) instead of the depicted cylinder so that the spring 907 may be coupled with the shank.

The exemplary embodiment has the spring 907 run from one end cap 906 to another end cap 906 on the opposite side of the housing 900. Therefore, there are a pair of side through-holes large enough to pass the spring through 907 in the wheel housing base 901 and spaced longitudinally identically to the through-holes of the wheel housing wings 902 where the end caps 906 are placed.

T-SLOT TRACK AND OTHER ALTERNATIVE EMBODIMENTS: Alternative embodiments of the present invention may have tray components and tray base built with a track, such as a T-slot, to distinguish in some aspects from the "channel-less" embodiments of the tray components 400, 500, 900 and tray base 201 described earlier. This facilitates the positioning of a tray component on the tray base in that the user would only need to apply a force to slide the tray component along a track and focus just on axially aligning the fastener holes used to couple a tray component to the tray base it is sliding on.

Figure 20:
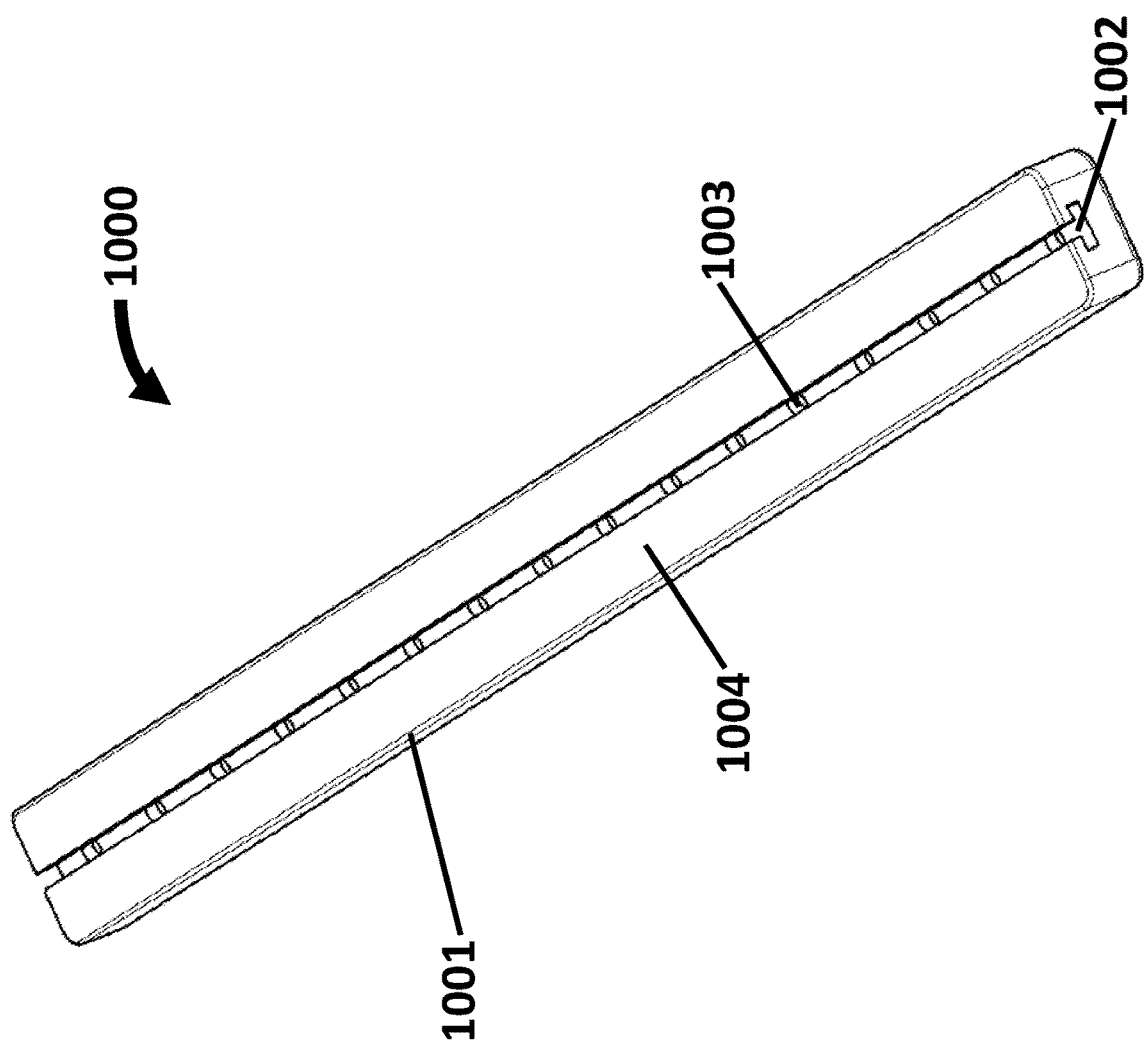
FIG. 20 is a view of a T-slotted tray

FIG. 20 is a view of a T-slotted tray 1000 comprising a tray base 1001, a T-slot channel 1002, and a plurality of fastening holes 1003. In the exemplary embodiment, the T-slot channel 1002 is shaped and dimensioned to allow a head of a T-slot nut to slide into, within, and out of the channel. Hence, the T-slot channel 1002 of constant cross-section extends from one axial end of the tray base 1001 to the other axial end of the tray base.

The plurality of fastening holes 1003 may be through-holes arranged along a line from nearly one end of the tray base 1001 to the other end of the tray base. The pitch spacing, diameter, and the surface topology (e.g., threaded, threaded using an insert, or unthreaded) of each and every hole 1003 is the same as the attributes recited for the holes 202 of the earlier described embodiment of the tray base. The bottom surfaces of tray components sit on the top surfaces 1004 of the T-slotted tray base.

Figure 21:
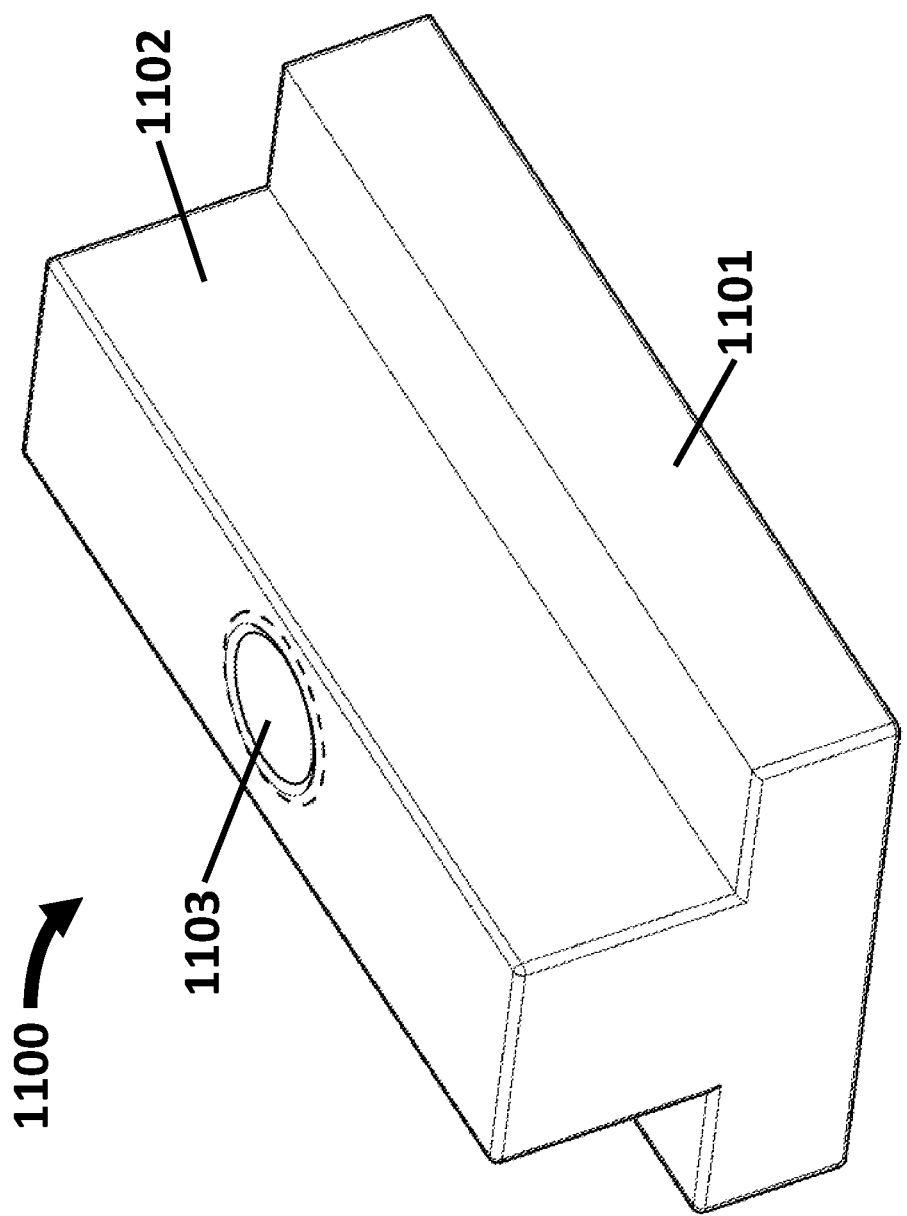
FIG. 21 is a view of an exemplary T-slot nut

FIG. 21 is a view of an exemplary T-slot nut 1100 with a constant "T" shaped cross-section from one end to the opposite end. This "T" cross-section has a "head" portion 1101 and a "stem" portion 1102. A fastener hole 1103 capable of receiving a pin or threaded fastener extends through the T-slot nut 1100 from one end of the stem 1102 to the head end 1101.

Figure 22:
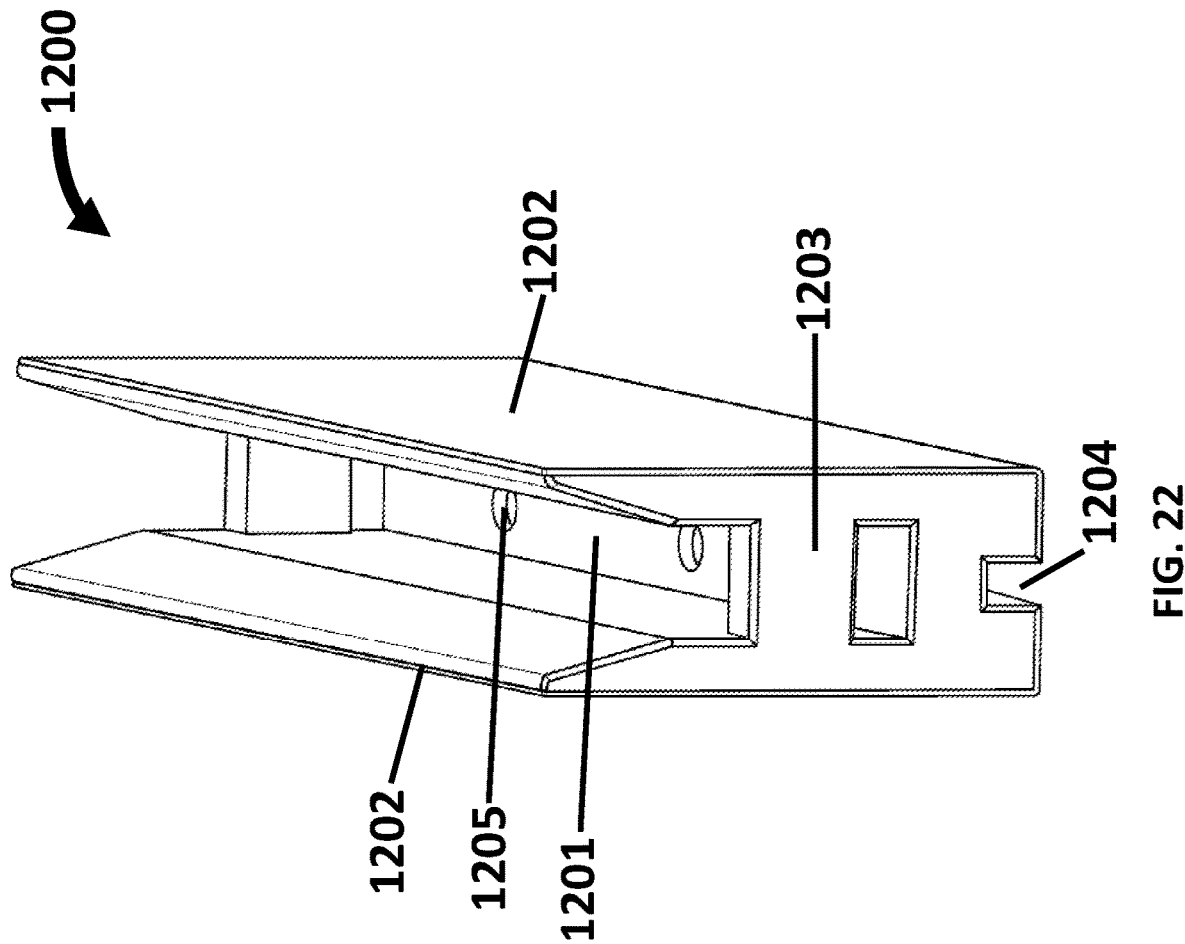
FIG. 22 is a view of a front wheel housing with a channel in its base shaped to receive a stem of the T-slot nut
Figure 23:
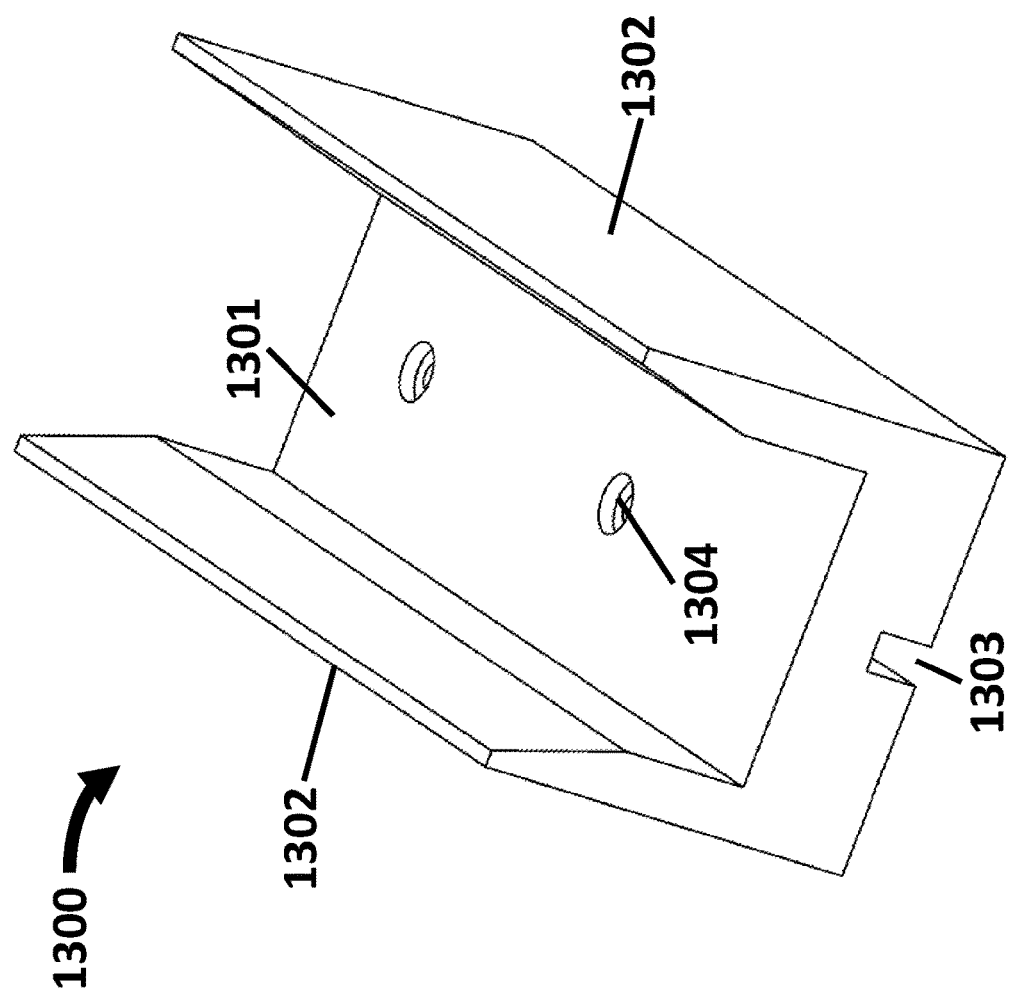
FIG. 23 is a view of a wide rear wheel housing with a channel in its base shaped to receive a stem of the T-slot nut

FIGS. 22-23 show views of an alternative embodiment of a front wheel housing 1200 and an alternative embodiment of a rear wheel housing 1300 each designed to accommodate the stem portion 1102 of a T-slot nut 1100. Each wheel housing 1200, 1300 here comprises common elements and a general layout of the wheel housing embodiments 400, 900, where the common elements include a base 1201, 1301; a pair of wings 1202, 1302; and a wheel chock 1203 for the front wheel housing 1200. Each wheel housing 1200, 1300 further comprises a channel 1204, 1303 on its bottom. The channel 1204, 1303 of these wheel housings are shaped and dimensioned to allow the stem 1102 of a T-slot nut 1100 to slide into, within, and out of the channel 1204, 1303. A plurality of fastener through-holes 1205, 1304 with pitch spacing identical to the tray base 1001 is also present in the base 1201, 1301 in the same manner as holes 404, 908 of the earlier described channel-less wheel housings.

Figure 24:
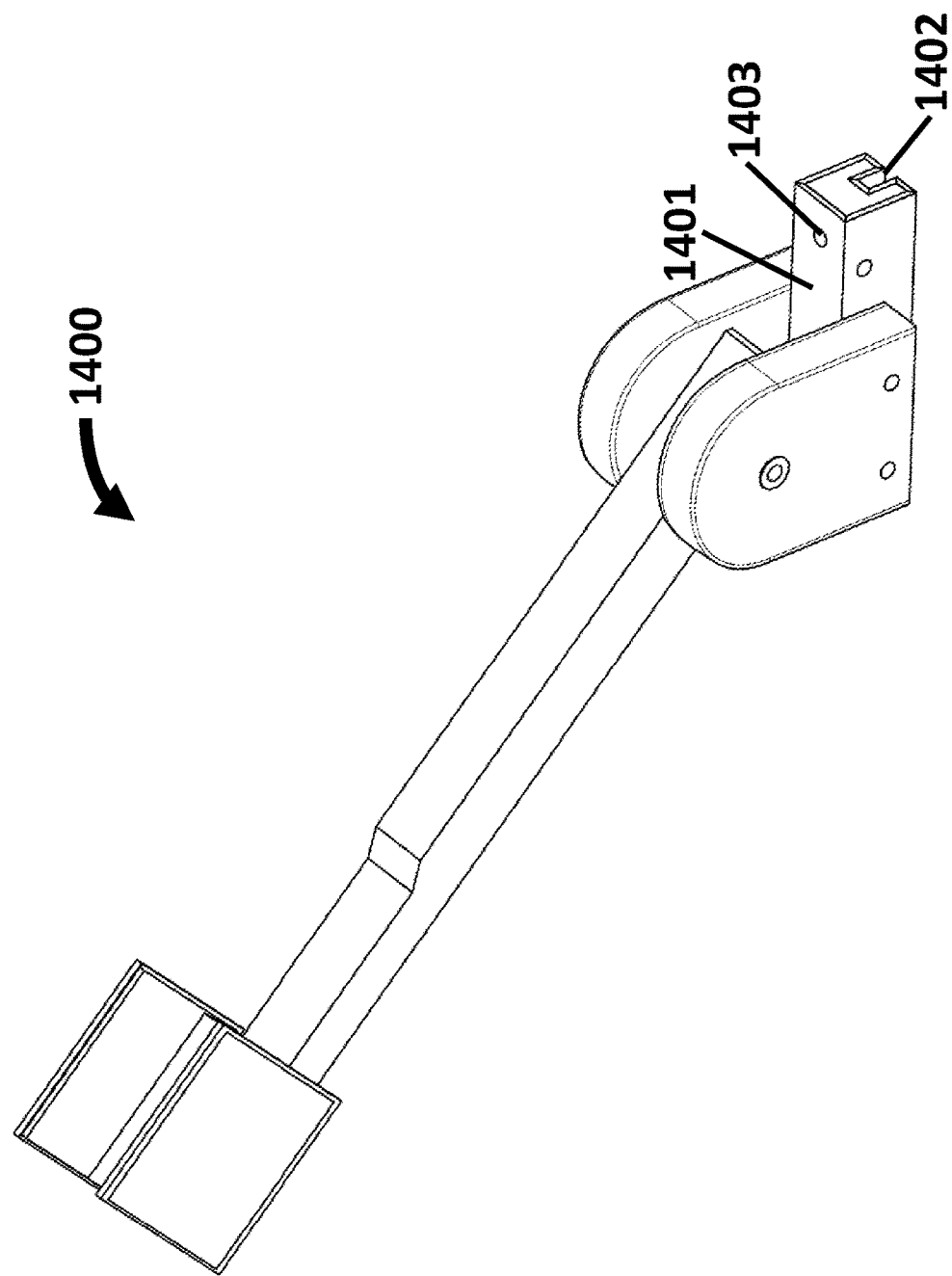
FIG. 24 is a view of a swing arm assembly with a channel in its base shaped to receive a stem of the T-slot nut

FIG. 24 is a view of an alternative embodiment of a swing arm assembly 1400 comprising a swing arm assembly base 1401 with a channel 1402 on the side of said swing arm assembly base 1401 that would interface with the tray base 1001. The channel 1402 of this swing arm assembly base is shaped and dimensioned to allow the stem 1102 of a T-slot nut 1100 to slide into, within, and out of the channel of the swing arm assembly base 1401 of this swing arm assembly 1400. The through hole 1403 of the swing arm assembly base is analogous to the hole 509 of the channel-less swing arm assembly discussed earlier.

In practice, a plurality of T-slot nuts 1100 would be fastened to the tray components 1200, 1300, 1400 with fasteners disposed through the holes 1103, 1205, 1304, 1403 without protruding beyond the surface of the head 1101 of each T-slot nut so there would be no interference between these fasteners and channel 1002 of the tray base. Then the heads 1101 of each of the plurality of T-slot nuts attached to one of the tray components 1200, 1300, 1400 would be introduced through the channel 1002 of the tray base 1001. The tray components 1200, 1300, 1400 would be longitudinally positioned to the desired position where the fastener holes 1103 are aligned with the holes 1103 of the T-slot nuts attached to one of the tray components 1200, 1300, 1400. Then the tray components 1200, 1300, 1400 with the attached T-slot nut 1100 are fastened to the holes 1003 of the tray base. In a reverse arrangement, alternative embodiments (not shown) of the present invention may have the channel of the wheel housings 1200, 1300 and swing arm assembly 1400 accommodate the head 1101 of the T-slot nut while the channel of the tray base accommodate the stem 1102 of the T-slot nut.

Instead of having holes 202, 1003 along the tray base 201, 1001 to receive fasteners for positioning and securing various tray components 400, 500, 900, 1200, 1300, 1400 to the tray base 201, 1001, alternative embodiments of the tray base 201, 1001 may have tracks with detents (not shown). The types of detents may comprise periodic grooves like the surface of a commonly known zip tie, an array of dimples where each dimple comprises a local topological depression that can receive a ball or pin, or a rack gear. Spring-loaded quick-release shafts (not shown) further facilitate positioning and securing the tray components 400, 500, 900, 1200, 1300, 1400 to the tray base 201, 1001.

Another alternative embodiment for securing the tray components 400, 500, 900 would comprise wheel housings 400, 900 or swing arm assemblies 500 that are attached to a C-bracket (not shown), where the concave faces of the C-bracket fit around the tray base 201. That way, the wheel housings 400, 900 and swing arm assembly 500 on the tray base 201 are free to slide along the tray base 201 between the cross-members 300 like a monorail train or a seated row of an exercise machine on each of their respective tracks. For this embodiment, the middle concave-outward-facing side of a C-bracket has a plurality of holes along its length and is attached to the underside of the wheel housing base 401 of each wheel housing 400, 900, or swing arm assembly base 504 of the swing arm assembly 500. The holes in the C-bracket are spaced apart and dimensioned like that of the holes 202 of the tray base, the wheel housing base 401, 901, and the base 504 of the swing arm assembly.

For the described C-bracket embodiment, fixing each wheel housing 400, 900 and swing arm assembly 500 can be done by a wide variety of methods including passing a short locking pin (not shown) through non-threaded aligned holes of the tray base 201 and the underside of each wheel housing base 401, 901 and swing arm assembly base 504 of the swing arm assembly and the holes of the C-bracket in between. Embodiments of the locking pin may have one or more ball valves protruding off the curved surface of the locking pin's shaft to retain the locking pin once placed; such an embodiment of this locking pin is like a weight stack ball valve locking pin used in some exercise universal weight training machines.

MATERIALS AND CONSTRUCTION: Suitable materials for the rack components are as follows. The tray base 201, tray riser block 203, cross-member base 301, wheel housing base 401, 901, wheel housing wing 402, 902, wheel chock 403, 903, swing arm 501, wheel-securing wing 502, and pin bore housings 505 can be made of hardwood, plastic, composites, or metal. Appropriate wood materials comprise those suitable for bookshelves like alder wood, white oak, walnut, maple, mahogany, redwood pine, and birch. The best types of plastics and composites are those that are not brittle or prone to crack under impact loads when a bicycle is lifted and dropped on a tray or when a fastener is tightened down. Nylon, polypropylene, and fiberglass are some of the potentially usable types of plastics and composites. Fastener threads in plastic, composite, or wooden materials may be most durable if they are from threaded metal inserts. For transportability, suitable metals comprise those with a high strength-to-weight ratio like aluminum. If the metal is of the sheet metal variety, threaded fastener inserts will also be required whenever threaded fasteners are used. For embodiments using a T-slot nut 1100, the tray base 1000 and elements of the tray components 1200, 1300, 1400 are preferably made from metal.

EXAMPLE DIMENSIONS: Table 1 lists dimensions in inches units of some components of one embodiment of the system 100 to help characterize key geometric scales of an embodiment of the present invention as applied for bicycles 600. Different dimensions are possible for similar and other types of two-wheeled vehicles comprising an e-bike, moped, scooter, and motorcycle while retaining the spirit and scope of the embodiment. For example, the dimensions of the components of the front and rear wheel housings 400, 900 are different. However, in certain embodiments, the front and rear wheel housings 400, 900 can have the same geometry. In the table, the width of the base is dimensioned is 1.00 inch wide, so if the wheel housing 400 comprising this base is a fixed width embodiment, the wheel housing 400 is dimensioned to accommodate bicycles with road tires/wheels.

TABLE 1

Example Dimensions (inches) from an Embodiment

| PART DESCRIPTION (REFERENCE NUMERAL) | DIMENSION 1 | DIMENSION 2 | DIMENSION 3 |
|---|---|---|---|
| Tray base (201), length × width × thickness | 48.00 | 3.00 | 0.75 |
| Tray base hole (202), diameter × centerline spacing | 0.375 | 3.00 | |
| Tallest riser block (203), length × width × height | 4.00 | 2.00 | 3.00 |
| Cross-member base (301), length × width × thickness | 24.00 | 4.25 | 0.75 |
| Cross-member base primary hole (302), diameter × centerline spacing | 0.312 | 3.5 | |
| Cross-member base secondary hole (303), diameter | 0.188 | | |
| Front wheel housing base (401), length × height × width | 10.00 | 0.65 | 1.00 |
| Rear wheel housing base (401), length × height × width | 12.00 | 0.65 | 1.00 |
| Front wheel housing wing (402), length × height × thickness | 12.00 | 4.75 | 0.50 |
| Rear wheel housing wing (402), length × height × thickness | 10.00 | 3.00 | 0.50 |
| Swing arm (501), length × max. height × thickness | 14.00 | 1.00 | 1.00 |
| Wheel-securing base (504), length × height × width | 5.00 | 0.75 | 1.10 |
| Wheel-securing wing (502), length × height × thickness | 2.95 | 3.00 | 0.50 |
| Pin bore housing (505), length × thickness | 3.00 | 0.75 | |
| Pin bore housing (505), bottom-to-pin bore center height | 2.447 | | |
| Diameter of pin bore (507) | 0.49 | | |
| Diameter of spring end cap (906) | 0.75 | | |
| Shank (908) of spring end cap, diameter × length | 0.35 | 0.375 | |

Many alterations and modifications may be made by those having ordinary skills in the art without departing from the spirit and scope of the embodiment. Therefore, it must be understood that the illustrated embodiment has been set forth only for the purposes of example and that it should not be taken as limiting the embodiment as defined by the following claims. For example, although the elements of a claim are set forth below in a certain combination, it must be expressly understood that the embodiment includes other combinations of fewer, more, or different elements, which are disclosed herein even when not initially claimed in such combinations.

VELCRO® is a registered trademark of Velcro BVBA.

What is claimed is:

1. A system for storing and transporting one or more two-wheeled vehicles, comprising:
   a plurality of trays, wherein each tray comprises a tray base, one or more slotted wheel housing(s), and a wheel-securing subassembly;
   one or more cross-member(s);
   a plurality of casters and/or resting pads;
   a swing arm;
   wherein said tray bases are attached to said cross-member(s) at an orthogonal angle;
   wherein said casters and/or resting pads are each attached to the underside of each said cross-member;
   wherein each said cross-member each comprises a base;
   said base of each said cross-member comprises a plurality of primary fastener through-holes along the length of said base of each said cross-member;
   said base of each said cross-member further comprises a plurality of fastener holes for attaching said casters and/or resting pads to said base of each said cross-member.

2. The system as recited in claim 1, further comprising a plurality of riser blocks to elevate the height of each said tray base.

3. The system as recited in claim 1, wherein said tray bases each comprise a plurality of fastener through-holes along the length of each said tray base.

4. The system as recited in claim 3, wherein said through-holes that are adjacent to each other have a center-to-center spacing that is 1/10th or smaller than a wheelbase of said two-wheeled vehicle with a shortest wheelbase intended for parking on said tray.

5. The system as recited in claim 1:
   wherein said primary fastener through-holes of said base of each said cross-member that are adjacent to each other have a center-to-center spacing that is in the range of 10% to 50% larger than the width of the tray base;
   wherein said width of the tray base is 1.15 times to 5 times the maximum tire width of said two-wheeled vehicle intended for parking on said tray.

6. The system as recited in claim 5:
   wherein said base of each said cross-member comprises a plurality of secondary fastener through-holes alongside said primary fastener through-holes;
   wherein said secondary fastener through-holes have a center-to-center spacing identical to the center-to-center spacing of said primary fastener through-holes;
   wherein said secondary fastener through-holes are not along the same position as said primary fastener through-holes along the length of said base of each said cross-member.

7. The system as recited in claim 1, wherein said base of each said cross-member further comprises a lateral joint jutting orthogonally out from a portion of the base of each said cross-member with a fastener through-hole so that said lateral joint is attachable to said tray base.

8. The system as recited in claim 7, wherein the lateral joint of each base of each said cross-member is located so that no two lateral joints attach to the same tray base.

9. The system as recited in claim 1, wherein each said wheel housing further comprises:
   a base;
   a pair of wings attached to the lateral extents of said base of each said wheel housing;
   said wings each comprising a pair of parallel inner-facing surfaces on the lower portion of said wings and a pair of surfaces that splay out toward an open end of each said wheel housing.

10. The system as recited in claim 9, wherein said base of each said wheel housing further comprises a plurality of vertical fastener through-holes along the length of said base of each said wheel housing.

11. The system as recited in claim 9 wherein each said wheel housing further comprises:
    a pair of wheel chocks;
    wherein said wheel chocks are attached to at least one wing of each said wheel housing.

12. The system as recited in claim 9 wherein said wheel housing further comprises:
    a pair of spring-with-end-cap subassemblies;
    wherein each of said spring-with-end-cap subassemblies comprises a pair of end caps attached to opposite distal ends of a spring;
    a plurality of guide pins;
    each of said wings includes a plurality of through-holes to accommodate one or more guide pins and the spring-with-end-cap subassemblies; and
    a plurality of through-holes running laterally within the base of each said wheel housing along the length of said base of each said wheel housing and aligned with said through-holes of said wings to accommodate one or more guide pins and springs of said spring-with-end-cap subassemblies.

13. The system as recited in claim 1, wherein said wheel-securing subassembly further comprises:
    a base;
    a pair of pin bore housings each attached to the opposite lateral extents of said base of said wheel-securing subassembly;
    a shaft running through said pin bore housings and swing arm so that a fulcrum point or fulcrum is established;
    said fulcrum point being closer to one end of said swing arm; and
    a pair of wings attached to each side of said swing arm at the end of the swing arm furthest from the fulcrum to form a wing-swing arm slot.

14. The system as recited in claim 13, wherein said wheel-securing subassembly further comprises an attachment element.

15. The system as recited in claim 13, wherein said base of said wheel-securing subassembly further comprises a plurality of vertical fastener through-holes along the length of said base of said wheel-securing subassembly.

16. The system as recited in claim 13, wherein said base of said wheel-securing subassembly further comprises a plurality of fastener side holes along the length of said base of said wheel-securing subassembly.

17. The system as recited in claim 1, wherein each of said casters further comprises:
    a rotatable swivel plate;
    wherein said rotatable swivel plate of said casters are all attached to only one base of said cross-member of said system.

18. The system as recited in claim 1, wherein each of said tray bases, each said wheel housing, and each said wheel-securing subassembly comprises a channel for accommodating either a head or a stem of a T-slot nut.

19. The system as recited in claim 13, wherein each said wheel-securing subassembly and each said swing arm are placed between said front wheel and a rear wheel of said two-wheeled vehicle.

* * * * *